United States Patent
Wang et al.

(10) Patent No.: US 11,836,497 B2
(45) Date of Patent: Dec. 5, 2023

(54) OPERATION MODULE AND METHOD THEREOF

(71) Applicant: SHANGHAI CAMBRICON INFORMATION TECHNOLOGY CO., LTD, Shanghai (CN)

(72) Inventors: Bingrui Wang, Shanghai (CN); Shengyuan Zhou, Shanghai (CN); Yao Zhang, Shanghai (CN)

(73) Assignee: SHANGHAI CAMBRICON INFORMATION TECHNOLOGY CO., LTD, Shanghai (CN)

( * ) Notice: Subject to any disclaimer, the term of this patent is extended or adjusted under 35 U.S.C. 154(b) by 118 days.

(21) Appl. No.: 16/075,836

(22) PCT Filed: Jul. 23, 2018

(86) PCT No.: PCT/CN2018/096710
§ 371 (c)(1),
(2) Date: May 6, 2021

(87) PCT Pub. No.: WO2019/148781
PCT Pub. Date: Aug. 8, 2019

(65) Prior Publication Data
US 2022/0091849 A1  Mar. 24, 2022

(30) Foreign Application Priority Data
Feb. 5, 2018  (CN) .......................... 201810110875.5

(51) Int. Cl.
*G06F 9/30* (2018.01)
*G06F 17/16* (2006.01)
*G06N 3/063* (2023.01)

(52) U.S. Cl.
CPC ........ *G06F 9/30181* (2013.01); *G06F 9/3001* (2013.01); *G06F 9/30007* (2013.01);
(Continued)

(58) Field of Classification Search
CPC ............. G06F 9/30181; G06F 9/30007; G06F 9/3001; G06F 9/30036; G06F 9/30145;
(Continued)

(56) References Cited

U.S. PATENT DOCUMENTS 3,260,997 A   7/1966 Arndt et al.
5,721,892 A   2/1998 Peleg et al.
(Continued)

FOREIGN PATENT DOCUMENTS

CN   1056356 A   9/2000
CN   1584824 A   2/2005
(Continued)

OTHER PUBLICATIONS

PCT/CN2018/096710, International Search Report, dated Nov. 8, 2018, 11 pages. (no English translation).
(Continued)

*Primary Examiner* — Corey S Faherty
(74) *Attorney, Agent, or Firm* — Getech Law LLC; Jun Ye

(57) ABSTRACT

There is provides an operation module, which includes a memory, a register unit, a dependency relationship processing unit, an operation unit, and a control unit. The memory is configured to store a vector, the register unit is configured to store an extension instruction, and the control unit is configured to acquire and parse the extension instruction, so as to obtain a first operation instruction and a second operation instruction. An execution sequence of the first operation instruction and the second operation instruction can be determined, and an input vector of the first operation instruction can be read from the memory. The operation unit is configured to convert an expression mode of the input data index of the first operation instruction and to screen data, and to execute the first and second operation instruction
(Continued)

according to the execution sequence, so as to obtain an extension instruction.

57 Claims, 8 Drawing Sheets

(52) U.S. Cl.
CPC ...... *G06F 9/30036* (2013.01); *G06F 9/30145* (2013.01); *G06F 17/16* (2013.01); *G06N 3/063* (2013.01)

(58) Field of Classification Search
CPC ....... G06F 17/16; G06F 9/3853; G06N 3/063; G06N 3/0454
See application file for complete search history.

(56) References Cited

U.S. PATENT DOCUMENTS

| | | | |
|---|---|---|---|
| 6,115,812 | A | 9/2000 | Abdallah et al. |
| 8,898,516 | B2 | 11/2014 | Honda et al. |
| 10,459,866 | B1* | 10/2019 | Fleming, Jr. ......... G06F 13/4027 |
| 2008/0228846 | A1 | 9/2008 | Hondou et al. |
| 2009/0172356 | A1* | 7/2009 | Valentine ............ G06F 9/30185 |
| | | | 712/E9.016 |
| 2013/0111190 | A1* | 5/2013 | Muff ..................... G06F 9/3832 |
| | | | 712/E9.028 |
| 2013/0305020 | A1* | 11/2013 | Valentine ............ G06F 9/30047 |
| | | | 712/222 |
| 2015/0067009 | A1 | 3/2015 | Strauss et al. |
| 2018/0074824 | A1 | 3/2018 | Sazegari et al. |
| 2018/0157969 | A1 | 6/2018 | Xie et al. |
| 2018/0315399 | A1* | 11/2018 | Kaul ................... G06F 9/30014 |
| 2018/0322390 | A1* | 11/2018 | Das ...................... G06F 9/3016 |

FOREIGN PATENT DOCUMENTS

| | | | |
|---|---|---|---|
| CN | 101217304 | A | 7/2008 |
| CN | 101501634 | A | 8/2009 |
| CN | 102012802 | A | 4/2011 |
| CN | 102360344 | A | 2/2012 |
| CN | 102750127 | A | 10/2012 |
| CN | 103678257 | A | 3/2014 |
| CN | 104238993 | A | 12/2014 |
| CN | 105144203 | A | 12/2015 |
| CN | 105518625 | A | 4/2016 |
| CN | 106990940 | A | 7/2017 |
| CN | 106991077 | A | 7/2017 |
| CN | 107315564 | A | 11/2017 |
| CN | 107315574 | A | 11/2017 |
| CN | 107315716 | A | 11/2017 |
| CN | 107329936 | A | 11/2017 |
| CN | 107608715 | A | 1/2018 |
| CN | 107704433 | A | 2/2018 |
| CN | 107832845 | A | 3/2018 |
| CN | 107861757 | A | 3/2018 |
| CN | 107992329 | A | 5/2018 |
| CN | 108009126 | A | 5/2018 |
| CN | 108154228 | A | 6/2018 |
| EP | 2302510 | A1 | 3/2011 |
| EP | 3336693 | A1 | 6/2018 |
| WO | 2017185418 | A1 | 11/2017 |

OTHER PUBLICATIONS

T. Chen, et al., "A Small-Footprint Accelerator for Large-Scale Neural Networks", ACM Transactions on Computer Systems, vol. 33, No. 2, Article 6, May 2015, 27 pages.
Z. Du, et al., "An Accelerator for High Efficient Vision Processing", IEEE Transactions on Computer-aided Design of Integrated Circuits and System, vol. 36, No. 2, Feb. 2017, pp. 227-240.
S. Liu, et al., "Cambricon: An Instruction Set Architecture for Neural Networks", 2016 ACM/IEEE 43rd Annual International Symposium on Computer Architecture, Oct. 12, 2016, pp. 393-405.
S. Zhang, et al., "Cambricon-X an Accelerator for Sparse Neural Networks", The 49th Annual IEEE/ACM International Symposium on Microarchitecture Article No. 20, Oct. 15, 2016, 12 pages.
Y. Chen, et al., "DaDianNao: A Machine-Learning Supercomputer", 2014 47th Annual IEEE/ACM International Symposium on Microarchitecture, Dec. 13, 2014, pp. 609-622.
T. Luo, et al., "DaDianNao: A Neural Network Supercomputer", IEEE Transaction on Computers, vol. 66, No. 1, Jan. 2017, pp. 73-88.
T. Chen, et al., "DianNao: A Small-Footprint High-Throughput Accelerator for Ubiquitous Machine-Learning", ASPLOS 14, Proceedings of the 19th international conference on Architectural support for programming languages and operating systems, Feb. 24, 2014, pp. 269-283.
Y. Chen, et al., "DianNao Family: Energy-Efficient Hardware Accelerators for Machine Learning", Communications of the ACM, vol. 59, No. 11, Nov. 2016, pp. 105-112.
D. Liu, et al., "PuDianNao: A Polyvalent Machine Learning Accelerator", ASPLOS '15 Proceedings of the Twentieth International Conference on Architectural Support for Programming Languages and Operating Systems, Mar. 14, 2015, pp. 369-381.
Z. Du, et al., "ShiDianNao: Shifting Vision Processing Closer to the Sensor", ISCA '15 Proceedings of the 42nd Annual International Symposium on Computer Architecture, Jun. 13, 2015, pp. 92-104.
201810913978.5—Office Action, dated May 29, 2019, 15 pages.
201810912879.5—Office Action, dated Jun. 14, 2019, 9 pages.
201810899812.2—Office Action, dated Jun. 14, 2019, 8 pages.
"Swap operation on C + + container", imkelt Blog, Aug. 15, 2016, Retrieve from: https://blog.csdn.net/imkelt/article/details/52213735?Utm_medium=distribute.wap_relevant.None-task-blog-BlogCommendFromMachineLeamPai2-I. Nonecase & depth I-utm source=distribute.wap_relevant.None-taskblog-BlogCommendFrom-MachineLeamPai2-I. (6 Pages) with brief English explanation.
CN 201810899812.2—Second Office Action, dated Aug. 26, 2019, 16 pages.
CN 201810912879.5—Second Office Action, dated Aug. 26, 2019, 22 pages.
CN 201810912901.6—First Office Action, dated May 21, 2020, 22 pages.
CN 201810912901.6—Second Office Action, dated Jan. 19, 2021, 21 pages.
CN 201810912904.X—First Office Action, dated Nov. 18, 2022, 17 pages.
CN 201810913978.5—Second Office Action, dated Aug. 29, 2019, 32 pages.
CN 201810914419.6—Fourth Office Action, dated Feb. 1, 2021, 27 pages.
CN 201810914419.6—Second Office Action, dated Aug. 20, 2020, 07 pages.
CN 201810914419.6—Third Office Action, dated Oct. 9, 2020, 25 pages.
CN 201810914419.6—First Office Action, dated Mar. 23, 2020, 18 pages.
CN 201810914599.8—First Office Action, dated Nov. 16, 2022, 17 pages.
CN 201810914600.7—First Office Action, dated Jun. 1, 2021, 26 pages.
CN 201810914600.7—Notification to Grant Patent Right for Invention, dated Mar. 28, 2020, 3 pages.
CN 201810914600.7—Second Office Action, dated Jan. 6, 2022, 8 pages.
CN 201810914646.9—First Office Action, dated May 20, 2020, 21 pages.
CN 201810914646.9—Notification to Grant Patent Right for Invention, dated Aug. 18, 2021, 4 pages.
CN 201810914646.9—Second Office Action, dated Nov. 13, 2020, 23 pages.
CN 201810914646.9—Third Office Action, dated May 17, 2021, 21 pages.
CN 201810914647.3—First Office Action, dated Nov. 18, 2022, 15 pages.

(56) References Cited

OTHER PUBLICATIONS

CN 201810914648.8—First Office Action, dated Nov. 18, 2022, 17 pages.
CN201810912880.8—First Office Action dated Dec. 2, 2022, 10 pages. (With Brief English Explanation).
CN201810913978.5—The Decision of Rejection dated Dec. 9, 2022, 19 pages. (With Brief English Explanation).
CN201810914420.9—First Office Action dated Dec. 2, 2022, 11 pages. (With Brief English Explanation).
CN201810914596.4—First Office Action dated Dec. 1, 2022, 10 pages. (With Brief English Explanation).

* cited by examiner

OPERATION MODULE AND METHOD THEREOF

CROSS REFERENCE TO RELATED APPLICATIONS

This application claims priority to Patent Application No. 201810110875.5, filed to China Intellectual Property Office on Feb. 5, 2018, and titled "OPERATION MODULE AND METHOD THEREOF", the disclosure of which is hereby incorporated by reference in its entirety.

TECHNICAL FIELD

The present disclosure relates to the field of communication technology, and particularly to an operation module and a method thereof.

BACKGROUND

In modern general-purpose and special-purpose processors, operation instructions (such as vector instructions) are increasingly introduced to carrying out operation. Vector instruction is an instruction that causes a processor to perform vector or matrix operations, such as addition and subtraction of vectors, inner product of vectors, matrix multiplication, matrix convolution, and so on. In a vector instruction, at least one input is a vector or a matrix, alternatively, at least one operation result is a vector or a matrix. Vector instruction can perform parallel calculation by calling vector processing units inside the processor to improve the operation speed. In the existing vector instructions, the vector or matrix in an operand or a result is generally of fixed size. For example, the vector instruction of the vector extensional structure Neon in the ARM processor can process a 32-bit floating-point vector of length 4 or a 16-bit fixed-point vector of length 8 at a time. However, existing vector operation instructions cannot implement variable-scale vector or matrix operation.

On the other hand, neural network as a high calculation amount and high memory access algorithm, the more weights, the larger amount of calculation and memory access. In order to reduce the amount of calculation and the number of weights, thereby reducing the amount of memory access, a sparse neural network is proposed. The sparse neural network is defined as follows. In a neural network, the number of weights with a zero value is large, and the distribution of weights with a non-zero value is irregular, and the neural network is referred to as a sparse neural network. A ratio of the number of elements with a weight value of zero to the number of all weight elements in the neural network, is defined as a sparseness of the neural network, as illustrated in FIG. 1a.

However, existing vector operation instructions cannot support an operation of sparse vector or sparse matrix in sparse neural networks, and cannot realize an operation of variable-scale sparse vector or sparse matrix, and the current vector operation instruction can only implement one kind of operation. For example, a vector instruction can only implement one kind of operation like multiplication or addition. A vector instruction cannot implement more than two kinds of operations, such that the existing vector operation has larger computational overhead and higher energy consumption.

SUMMARY

There is provided an operation module and a method thereof, which can realize a purpose that a variety of operations can be achieved by employing a single-strip operation instruction, thereby facilitating the operation module to reduce the operation overhead and the power consumption.

According to first aspect of the present disclosure, there is provided an operation module, which is applicable to execute operations according to an extension instruction and includes a memory, an operation unit, and a control unit.

The extension instruction includes an opcode and an opcode domain, the opcode includes a first operation instruction identifier, and the opcode domain includes an input data address of an first operation instruction, an input data index of the first operation instruction, an output data address of the first operation instruction, a second operation instruction identifier, an input data of an second operation instruction, types of the input data of the second operation instruction, and a length N of the input data of the second operation instruction.

The memory is configured to store input data of the first operation instruction;

The control unit is configured to acquire and parse the extension instruction, so as to obtain the first operation instruction, the second operation instruction, the input data address of the first operation instruction, the output data address of the first operation instruction, the input data index of the first operation instruction, and the input data of the second operation instruction. The control unit is further configured to determine an execution sequence of the first operation instruction and the second operation instruction according to the first operation instruction and the second operation instruction. The control unit is further configured to read the input data of the first operation instruction corresponding to the input data address of the first operation instruction from the memory according to the input data address of the first operation instruction.

The operation unit is configured to convert an expression mode of the input data index of the first operation instruction, so as to obtain an input data index of the first operation instruction in a default indexing expression mode. The operation unit is further configured to screen the input data of the first operation instruction according to the input data index of the first operation instruction in the default indexing expression mode, so as to obtain the input data processed of the first operation instruction. The operation unit is further configured to execute the first operation instruction and the second operation instruction for the input data processed of the first operation instruction and the input data of the second operation instruction respectively according to the execution sequence, so as to obtain an operation result.

In an implementation, the operation unit includes an index processing unit, which is configured to convert the expression mode of the input data index of the first operation instruction into the default indexing expression mode according to a converting instruction, based on a determination that the expression mode of the input data index of the first operation instruction is not the default expression mode, so as to obtain the input data index of the first operation instruction in the default indexing expression mode. The operation unit is configured to screen the input data of the first operation instruction according to the input data index of the first operation instruction in the default indexing expression mode, so as to obtain the input data processed of the first operation instruction.

In an implementation, the expression mode of the input data index of the first operation instruction includes a direct indexing expression mode, a step indexing expression mode, a list of list (LIL) expression mode, a coordinate list (COO)

expression mode, a compressed sparse row (CSR) expression mode, a compressed sparse column (CSC) expression mode, an Ellpack-ltpack (ELL) expression mode, and a hybrid (HYB) expression mode; and the default indexing expression mode includes the direct indexing expression mode, the step indexing expression mode, the LIL expression mode, the COO expression mode, the CSR expression mode, the CSC expression mode, the ELL expression mode, and the HYB expression mode.

In an implementation, the input data of the first operation instruction may be configured as sparse data, and when the input data index of the first operation instruction is expressed in the direct indexing expression mode, the input data index of the first operation instruction is a string consisting of 0's and 1's, where the number 0 indicates that an absolute value of an element in the input data of the first operation instruction is less than or equal to a preset threshold, the number 1 indicates that an absolute value of an element in the input data of the first operation instruction is greater than the preset threshold.

Alternatively, the input data of the first operation instruction may be configured as sparse data, and when the input data index of the first operation instruction is expressed in the step indexing expression mode, the input data index of the first operation instruction is a string consisting of a distance between an element in the input data of the first operation instruction whose absolute value is larger than the preset threshold between a previous element in the input data of the first operation instruction whose absolute value is larger than the preset threshold.

Alternatively, the input data of the first operation instruction is configured as sparse data, and the input data of the first operation instruction is expressed by a matrix form; when the input data index of the first operation instruction is expressed in the LIL expression mode, the input data index of the first operation instruction includes at least one list, and each of the at least one list includes at least one record, where the record includes a column index of an element in the input data of the first operation instruction whose absolute value is larger than the preset threshold and a value of the element whose absolute value is larger than the preset threshold.

Alternatively, the input data of the first operation instruction is configured as sparse data, and the input data of the first operation instruction is expressed by a matrix form; when the input data index of the first operation instruction is expressed in the COO expression mode, the input data index of the first operation instruction includes at least one tuple, and the tuple includes a row number and a column number, in a input data matrix of the first operation instruction, of an element in the input data matrix of the first operation instruction whose absolute value is greater than the preset threshold, and a value of the element.

Alternatively, the input data of the first operation instruction is configured as sparse data, and the input data of the first operation instruction is expressed by a matrix form; when the input data index of the first operation instruction is expressed in the CSR expression mode, the input data index of the first operation instruction includes a first array, a second array, and a third array; where the first array is configured to store a value of an element in the input data matrix of the first operation instruction whose absolute value is greater than the preset threshold, the second array is configured to store a column index, in the input data matrix of the first operation instruction, of an element in the input data matrix of the first operation instruction whose absolute value is larger than the preset threshold, the third array is configured to store a sum of the number of elements in each row and the number of elements in the preceding rows of the input data matrix of the first operation instruction whose absolute values are greater than the preset threshold, and a last element in the third array is configured to store the number of elements in the input data matrix of the first operation instruction whose absolute value are greater than the preset threshold.

Alternatively, the input data of the first operation instruction is configured as sparse data, and the input data of the first operation instruction is expressed by a matrix form; when the input data index of the first operation instruction is expressed in the CSC expression mode, the input data index of the first operation instruction includes a fourth array, a fifth array, and a sixth array; where the fourth array is configured to store a value of an element in the input data matrix of the first operation instruction whose absolute value is greater than the preset threshold, the fifth array is configured to store a row index, in the input data matrix of the first operation instruction, of an element in the input data matrix of the first operation instruction whose absolute value is larger than the preset threshold, the sixth array is configured to store a sum of the number of elements in each column and the number of elements in the preceding columns of the input data matrix of the first operation instruction whose absolute values are greater than the preset threshold, and a last element in the sixth array is configured to store the number of elements in the input data matrix of the first operation instruction whose absolute value are greater than the preset threshold.

Alternatively, the input data of the first operation instruction is configured as sparse data, and the input data of the first operation instruction is expressed by a matrix form; when the input data index of the first operation instruction is expressed in the ELL expression mode, the input data index of the first operation instruction includes a first matrix and a second matrix; where the first matrix is configured to store a column number, in the input data matrix of the first operation instruction, of an element in the input data matrix of the first operation instruction whose absolute value is greater than the preset threshold, the second matrix is configured to store a value of an element whose absolute value is greater than the preset threshold.

Alternatively, the input data of the first operation instruction is configured as sparse data, and the input data of the first operation instruction is expressed by a matrix form; when the input data index of the first operation instruction is expressed in the HYB expression mode, the input data index of the first operation instruction includes a third matrix, a fourth matrix, and at least one tuple; where the fourth matrix is configured to store a largest identical number of elements of each row in the input data matrix of the first operation instruction whose absolute values are greater than the preset threshold, the third matrix is configured to store a column number, in the input data matrix of the first operation instruction, of an element stored in the fourth matrix whose absolute value is greater than the preset threshold, each tuple of the at least one tuple is configured to store a row number, a column number, and a value of an additional element of each row of the input data matrix of the first operation instruction with respect to other rows.

In an implementation, the operation module further includes a register unit and a dependency relationship processing unit.

The register unit is configured to store the extension instruction.

The dependency relationship processing unit is configured to determine whether input data accessed by the extension instruction is the same as that accessed by a previous extension instruction prior to acquiring the extension instruction by the control unit; a first operation instruction and a second operation instruction of a current extension instruction are provided to the operation unit when the previous extension instruction have been executed based on a determination that the input data accessed by the extension instruction is the same as that accessed by the previous extension instruction, and the first operation instruction and the second operation instruction of the current extension instruction are provided to the operation unit based on a determination that the input data accessed by the extension instruction is not the same as that accessed by the previous extension instruction.

The dependency relationship processing unit is further configured to store the current extension instruction in a memory queue when the input data accessed by the extension instruction is the same as that accessed by the previous extension instruction, and to provide the current extension instruction in the memory queue to the control unit when the previous extension instruction have been executed.

In an implementation, the control unit includes a fetch subunit, a decoding subunit, and an instruction queue subunit. The fetch subunit is configured to obtain the extension instruction from the register unit. The decoding subunit is configured to decode the extension instruction to obtain the first operation instruction, the second operation instruction, and the execution sequence. The instruction queue subunit is configured to store the first operation instruction and the second operation instruction according to the execution sequence.

In an implementation, the operation unit further includes a vector adder circuit, a vector multiplier circuit, a comparison circuit, a nonlinear operation circuit, and a vector-scalar multiplier circuit. The operation unit is configured as a multi-pipeline architecture. The index processing unit is located at a first pipeline stage, the vector multiplier circuit and the vector-scalar multiplier circuit are located at a second pipeline stage, the comparison circuit and the vector adder circuit are located at a third pipeline stage, and the non-linear operation circuit is located at a fourth flow level, where an output data of the first pipeline stage is an input data of the second pipeline stage, an output data of the second pipeline stage is an input data of the third pipeline stage, and an output data of the third pipeline stage is an input data of the fourth pipeline stage.

In an implementation, the operation unit further includes a conversion circuit; the conversion circuit may be located at the second pipeline stage and the fourth pipeline stage. Alternatively, the conversion circuit may be located at the second pipeline stage. Alternatively, the conversion circuit may be located at the fourth pipeline stage.

In an implementation, the control unit is configured to determine whether an output data of the first operation instruction is the same as the input data of the second operation instruction, and to determine that the execution sequence is in forward order based on a determination that the input data of the first operation instruction is the same as the output data of the second operation instruction. The control unit is also configured to determine whether the input data of the first operation instruction is the same as the output data of the second operation instruction, and to determine that the execution sequence is in reverse order based on a determination that the input data of the first operation instruction is the same as the output data of the second operation instruction. The control unit is also configured to determine whether the input data of the first operation instruction is associated with the output data of the second operation instruction, and to determine that the execution sequence is out of order based on a determination that the input data of the first operation instruction is not associated with the output data of the second operation instruction. The control unit is also configured to determine whether the output data of the first operation instruction is associated with the input data of an second operation instruction, and to determine that the execution sequence is out of order based on a determination that the output data of the first operation instruction is not associated with the input data of an second operation instruction.

According to second aspect of the present disclosure, there is provided an operation method, the method includes the following.

An extension instruction may be acquired, where the extension instruction includes an opcode and an opcode domain, the opcode includes a first operation instruction identifier, and the opcode domain includes an input data address of an first operation instruction, an input data index of the first operation instruction, an output data address of the first operation instruction, a second operation instruction identifier, an input data of an second operation instruction, types of the input data of the second operation instruction, and a length N of the input data of the second operation instruction.

The extension instruction may be parsed, to obtain the first operation instruction, the second operation instruction, the input data address of the first operation instruction, the output data address of the first operation instruction, the input data index of the first operation instruction, and the input data of the second operation instruction. An execution sequence of the first operation instruction and the second operation instruction may be determined according to the first operation instruction and the second operation instruction. The input data of the first operation instruction corresponding to the input data address of the first operation instruction from the memory may be read according to the input data address of the first operation instruction. An expression mode of the input data index of the first operation instruction may be converted, so as to obtain an input data index of the first operation instruction in a default indexing expression mode. The input data of the first operation instruction may be screened according to the input data index of the first operation instruction in the default indexing expression mode, so as to obtain the input data processed of the first operation instruction. And the first operation instruction and the second operation instruction for the input data processed of the first operation instruction and the input data of the second operation instruction respectively, may be executed according to the execution sequence, so as to obtain an operation result.

In an implementation, an expression mode of the input data index of the first operation instruction may be converted as follows, so as to obtain an input data index of the first operation instruction in a default indexing expression mode.

A determination may be made whether the expression mode of the input data index of the first operation instruction is a default indexing expression mode.

The expression mode of the input data index of the first operation instruction into the default indexing expression mode may be converted according to a converting instruction, based on a determination that the expression mode of the input data index of the first operation instruction is not the default expression mode, so as to obtain the input data index of the first operation instruction in the default indexing expression mode.

In an implementation, the expression mode of the input data index of the first operation instruction may include a direct indexing expression mode, a step indexing expression mode, a list of list (LIL) expression mode, a coordinate list (COO) expression mode, a compressed sparse row (CSR) expression mode, a compressed sparse column (CSC) expression mode, an Ellpack-ltpack (ELL) expression mode, and a hybrid (HYB) expression mode; and the default indexing expression mode may include the direct indexing expression mode, the step indexing expression mode, the LIL expression mode, the COO expression mode, the CSR expression mode, the CSC expression mode, the ELL expression mode, and the HYB expression mode.

In an implementation, the input data of the first operation instruction is configured as sparse data, and when the input data index of the first operation instruction is expressed in the direct indexing expression mode, the input data index of the first operation instruction is a string consisting of 0's and 1's, where the number 0 indicates that an absolute value of an element in the input data of the first operation instruction is less than or equal to a preset threshold, the number 1 indicates that an absolute value of an element in the input data of the first operation instruction is greater than the preset threshold.

Alternatively, the input data of the first operation instruction is configured as sparse data, and when the input data index of the first operation instruction is expressed in the step indexing expression mode, the input data index of the first operation instruction is a string consisting of a distance between an element in the input data of the first operation instruction whose absolute value is larger than the preset threshold between a previous element in the input data of the first operation instruction whose absolute value is larger than the preset threshold.

Alternatively, the input data of the first operation instruction is configured as sparse data, and the input data of the first operation instruction is expressed by a matrix form; when the input data index of the first operation instruction is expressed in the LIL expression mode, the input data index of the first operation instruction includes at least one list, and each of the at least one list includes at least one record, where the record includes a column index of an element in the input data of the first operation instruction whose absolute value is larger than the preset threshold and a value of the element whose absolute value is larger than the preset threshold.

Alternatively, the input data of the first operation instruction is configured as sparse data, and the input data of the first operation instruction is expressed by a matrix form; when the input data index of the first operation instruction is expressed in the COO expression mode, the input data index of the first operation instruction includes at least one tuple, and the tuple includes a row number and a column number, in a input data matrix of the first operation instruction, of an element in the input data matrix of the first operation instruction whose absolute value is greater than the preset threshold, and a value of the element.

Alternatively, the input data of the first operation instruction is configured as sparse data, and the input data of the first operation instruction is expressed by a matrix form; when the input data index of the first operation instruction is expressed in the CSR expression mode, the input data index of the first operation instruction includes a first array, a second array, and a third array; where the first array is configured to store a value of an element in the input data matrix of the first operation instruction whose absolute value is greater than the preset threshold, the second array is configured to store a column index, in the input data matrix of the first operation instruction, of an element in the input data matrix of the first operation instruction whose absolute value is larger than the preset threshold, the third array is configured to store a sum of the number of elements in each row and the number of elements in the preceding rows of the input data matrix of the first operation instruction whose absolute values are greater than the preset threshold, and a last element in the third array is configured to store the number of elements in the input data matrix of the first operation instruction whose absolute value are greater than the preset threshold.

Alternatively, the input data of the first operation instruction is configured as sparse data, and the input data of the first operation instruction is expressed by a matrix form; when the input data index of the first operation instruction is expressed in the CSC expression mode, the input data index of the first operation instruction includes a fourth array, a fifth array, and a sixth array; where the fourth array is configured to store a value of an element in the input data matrix of the first operation instruction whose absolute value is greater than the preset threshold, the fifth array is configured to store a row index, in the input data matrix of the first operation instruction, of an element in the input data matrix of the first operation instruction whose absolute value is larger than the preset threshold, the sixth array is configured to store a sum of the number of elements in each column and the number of elements in the preceding columns of the input data matrix of the first operation instruction whose absolute values are greater than the preset threshold, and a last element in the sixth array is configured to store the number of elements in the input data matrix of the first operation instruction whose absolute value are greater than the preset threshold.

Alternatively, the input data of the first operation instruction is configured as sparse data, and the input data of the first operation instruction is expressed by a matrix form; when the input data index of the first operation instruction is expressed in the ELL expression mode, the input data index of the first operation instruction includes a first matrix and a second matrix; where the first matrix is configured to store a column number, in the input data matrix of the first operation instruction, of an element in the input data matrix of the first operation instruction whose absolute value is greater than the preset threshold, the second matrix is configured to store a value of an element whose absolute value is greater than the preset threshold.

Alternatively, the input data of the first operation instruction is configured as sparse data, and the input data of the first operation instruction is expressed by a matrix form; when the input data index of the first operation instruction is expressed in the HYB expression mode, the input data index of the first operation instruction includes a third matrix, a fourth matrix, and at least one tuple; where the fourth matrix is configured to store a largest identical number of elements of each row in the input data matrix of the first operation instruction whose absolute values are greater than the preset threshold, the third matrix is configured to store a column number, in the input data matrix of the first operation instruction, of an element stored in the fourth matrix whose absolute value is greater than the preset threshold, each tuple of the at least one tuple is configured to store a row number, a column number, and a value of an additional element of each row of the input data matrix of the first operation instruction with respect to other rows.

In an implementation, an execution sequence of the first operation instruction and the second operation instruction may be determined as follows, according to the first operation instruction and the second operation instruction.

A determination may be made whether an output data of the first operation instruction is the same as the input data of the second operation instruction, and a determination may be made that the execution sequence is in forward order based on a determination that the input data of the first operation instruction is the same as the output data of the second operation instruction.

A determination may be made whether the input data of the first operation instruction is the same as the output data of the second operation instruction, and a determination may be made the execution sequence is in reverse order based on a determination that the input data of the first operation instruction is the same as the output data of the second operation instruction.

A determination may be made whether the input data of the first operation instruction is associated with the output data of the second operation instruction, and a determination may be made the execution sequence is out of order based on a determination that the input data of the first operation instruction is not associated with the output data of the second operation instruction.

A determination may be made whether the output data of the first operation instruction is associated with the input data of an second operation instruction, and a determination may be made the execution sequence is out of order based on a determination that the output data of the first operation instruction is not associated with the input data of an second operation instruction.

As a third aspect of the present disclosure, there is provided an operation device, which includes one or more operation modules of the above-identified first aspect, and the operation device is configured to obtain data to be operated and control information from other processing devices, and to perform specified operations, and to pass an execution result to the other processing devices through I/O interfaces.

When the operation device includes a plurality of operation modules, the plurality of operation modules are configured to connect and to transmit data with each other through a specific structure.

The plurality of operation modules may be configured to interconnect and to transmit data with each other through a fast external device interconnection bus or a peripheral component interface express (PCIE) bus to support operations of a larger-scale neural network. The plurality of the computing modules may also be configured to share a control system or have respective control systems. The plurality of the operation modules may also be configured to share a memory or have respective memories. An interconnection manner of the plurality of operation modules may be configured as an optional interconnection topology.

As a fourth aspect of the present disclosure, there is provided a combined processing device, which includes the operation device of the above-identified third aspect, a universal interconnection interface and other processing devices.

The operation device is configured to interact with the other processing devices to perform user-specified operation.

As a fifth aspect of the present disclosure, there is provided a neural network chip, which includes the operation module of the above-identified first aspect, the operation device of the above-identified third aspect, or the combined processing device of the above-identified fourth aspect.

As a sixth aspect of the present disclosure, there is provided a neural network chip package structure, which includes the neural network chip of the above-identified fifth aspect.

As a seventh aspect of the present disclosure, there is provided an electronic device, which includes the neural network chip of the above-identified fifth aspect or the neural network chip package structure of the above-identified sixth aspect.

The extension of the vector instruction according to the present disclosure, is capable of strengthening the function of the instruction, and replacing original multiple instructions with one instruction, thereby reducing the number of instructions required for operations of complex vectors or matrices and simplifying using processes of vector instructions. Compared to multiple instructions, there is no need to store intermediate results, which can save storage space and avoid additional reading and writing overhead.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description illustrate some embodiments of the present disclosure. Those of ordinary skill in the art may also obtain other drawings based on these accompanying drawings without creative efforts.

It should be noted that dashed blocks in drawings are optional.

DETAILED DESCRIPTION OF ILLUSTRATED EMBODIMENTS

Technical solutions in the embodiments of the present disclosure will be described clearly and completely hereinafter with reference to the accompanying drawings in the embodiments of the present disclosure. Apparently, the described embodiments are merely some rather than all embodiments of the present disclosure. All other embodiments obtained by those of ordinary skill in the art based on the embodiments of the present disclosure without creative efforts shall fall within the protection scope of the present disclosure.

The terms "first", "second", "third" and "fourth" and the like in the specification, claims and the accompanying drawings of the present disclosure, are used to distinguish different objects and not intended to describe a specific order. Furthermore, the terms "comprise", "include" and any variation thereof, are intended to cover a non-exclusive inclusion. For example, a process, method, system, product, and device that include a series of steps or units are not limited to the steps or the units listed, but optionally includes steps or units not listed, or optionally further include other steps or units inherent to these processes, methods, products or devices. As used herein, "/" may represent a "or".

References to "embodiment" herein mean that the specific features, structures, or characteristics described in connection with an embodiment can be included in at least one embodiment of the disclosure. The phrases of "embodiment" in various places in the specification are not necessarily referring to the same embodiment, and are not independent or alternative embodiments that are mutually exclusive with regard to each other. Those skilled in the art should explicitly and implicitly understood that, the embodiments described herein may be in connection with other embodiments.

Figure 1A:
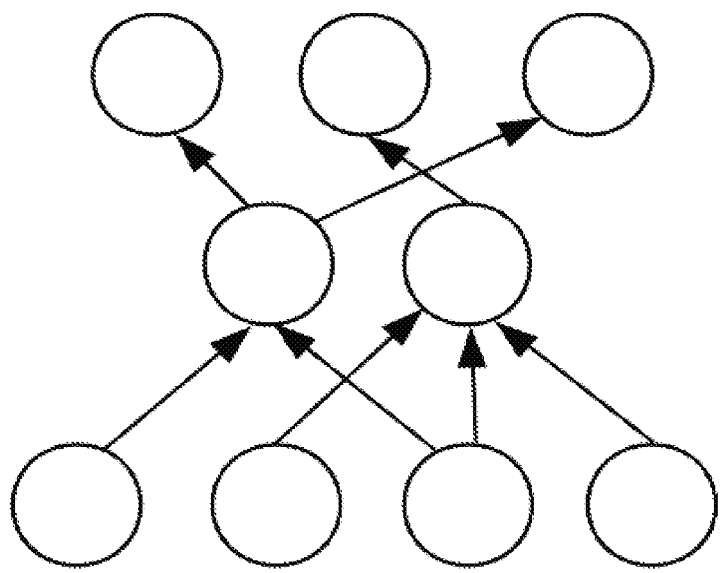
FIG. 1a is a schematic structure diagram of a sparse neural network according to an embodiment of the present disclosure.
Figure 1B:
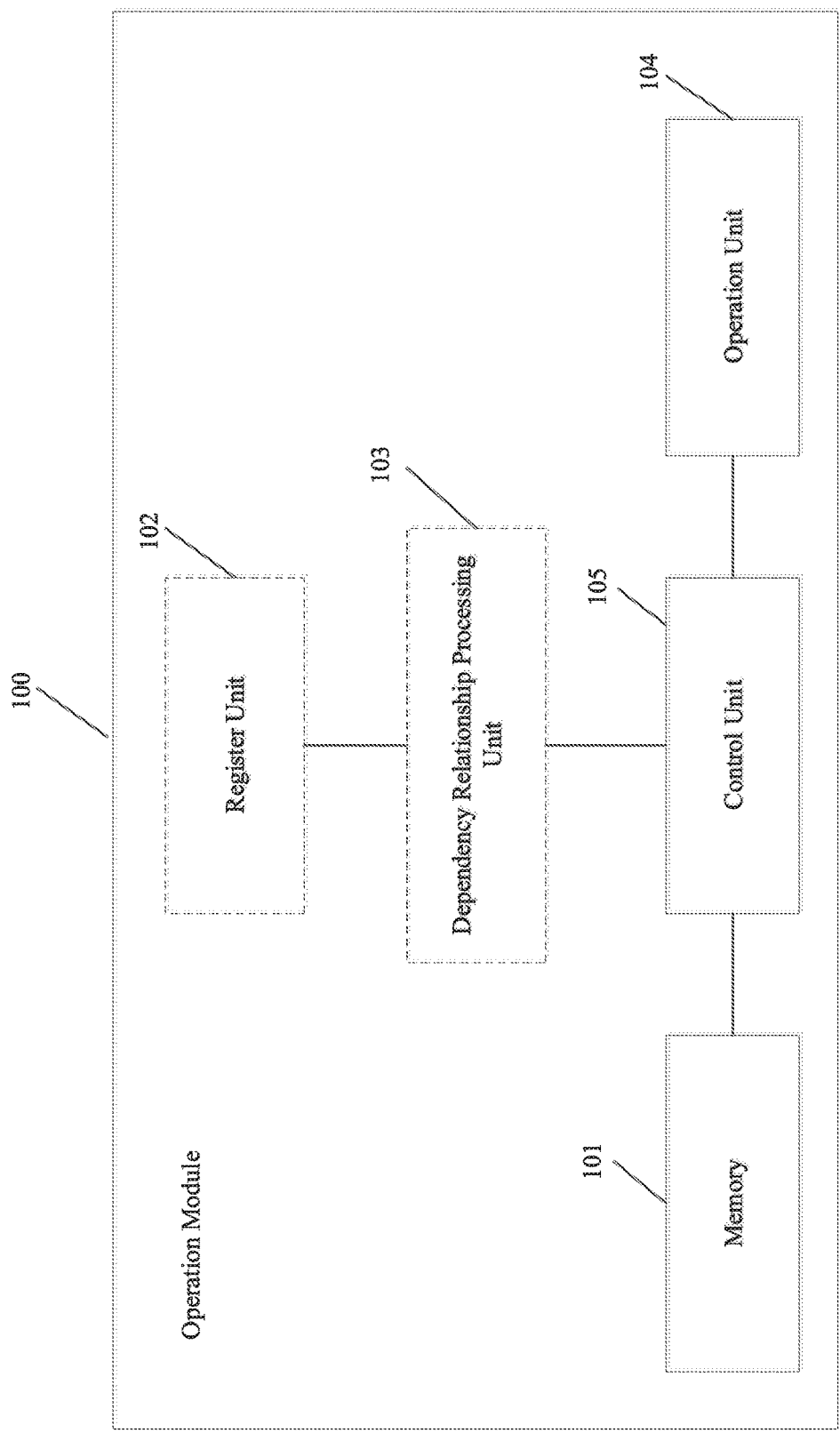
FIG. 1b is a schematic structure diagram of an operation module according to an embodiment of the present disclosure.

FIG. 1b is a schematic structural diagram of an operation module according to an embodiment of the present disclosure. The operation module 100 is applicable to execute operations according to an extension instruction. As illustrated in FIG. 1, the operation module 100 includes a memory 101, a register unit 102 (optionally), a dependency relationship processing unit 103 (optionally), an operation unit 104, and a control unit 105.

The above-mentioned extension instruction includes an opcode and an opcode domain. The opcode includes a first operation instruction identifier which is configured to indicate a first operation instruction; the opcode domain includes an input data address of the first operation instruction, an input data index of the first operation instruction, an output data address of the first operation instruction, a second operation instruction identifier, an input data of the second operation instruction, types of the input data of the second operation instruction, and a length N of the input data of the second operation instruction.

In an embodiment, the opcode domain of the extension instruction further includes a third operation instruction and an input data of the third operation instruction.

The memory 101 is configured to store input data of the first operation instruction. The register unit 102 is configured to store the extension instruction. The control unit 105 is configured to acquire and parse the extension instruction, so as to obtain the first operation instruction, the second operation instruction, the input data address of the first operation instruction, the output data address of the first operation instruction, the input data index of the first operation instruction, and the input data of the second operation instruction. The control unit 105 is also configured to read the input data of the first operation instruction corresponding to the input data address of the first operation instruction from the memory according to the input data address of the first operation instruction. The control unit 105 is also configured to determine an execution sequence of the first operation instruction and the second operation instruction according to the first operation instruction and the second operation instruction.

The operation unit 104 is configured to convert an expression mode of the input data index of the first operation instruction, so as to obtain an input data index of the first operation instruction in a default index expression mode and to screen the input data of the first operation instruction according to the input data index of the first operation instruction in the default index expression mode, so as to obtain the input data processed of the first operation instruction. The operation unit 104 is also configured to execute the first operation instruction and the second operation instruction for the input data processed of the first operation instruction and the input data of the second operation instruction respectively according to the execution sequence, so as to obtain an operation result.

Figure 2:
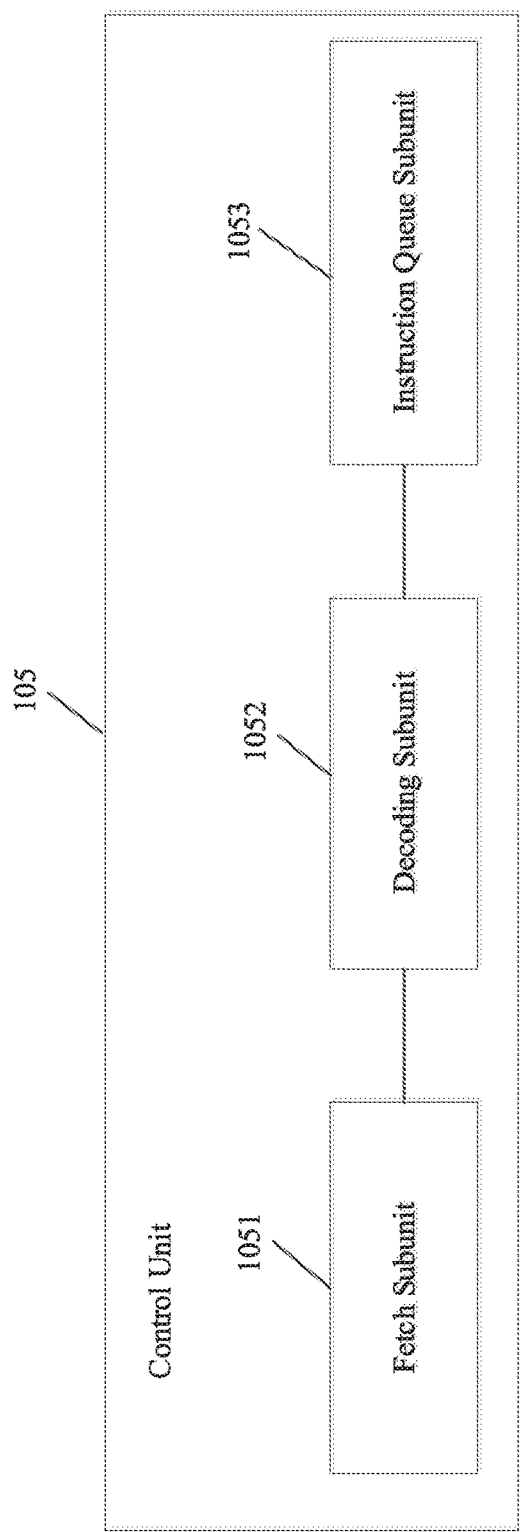
FIG. 2 is a partial schematic structure diagram of an operation module according to an embodiment of the present disclosure.
Figure 3:
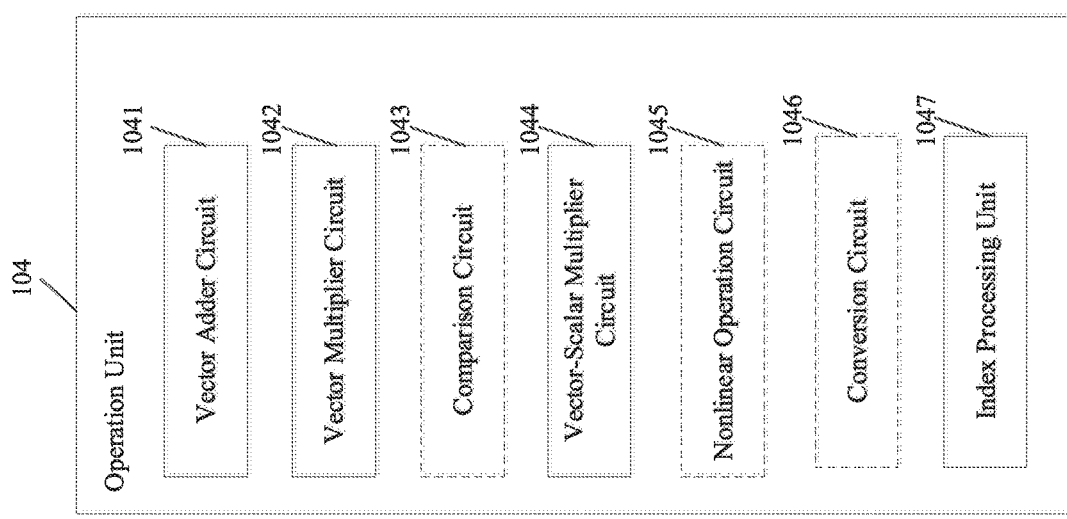
FIG. 3 is a partial schematic structure diagram of another operation module according to an embodiment of the present disclosure.

Specifically, as illustrated in FIG. 2, the control unit 105 includes a fetch subunit 1051, a decoding subunit 1052, and an instruction queue subunit 1053.

The fetch subunit 1051 is configured to obtain the extension instruction from the register unit 102. The decoding subunit 1052 is configured to decode the extension instruction to obtain the first operation instruction and the second operation instruction, and to determine the execution sequence of the first operation instruction and the second operation instruction according to the first operation instruction and the second operation instruction. The instruction queue subunit 1053 is configured to store the first operation instruction and the second operation instruction according to the execution sequence.

The operation unit 104 includes a vector adder circuit 1041, a vector multiplier circuit 1042, a comparison circuit 1043 (optionally), a vector-scalar multiplier circuit 1044, a nonlinear operation circuit 1045 (optionally), a conversion circuit 1046 (optionally), and an index processing unit 1047.

Specifically, the index processing unit 1047 is configured to determine whether the expression mode of the input data index of the first operation instruction is a default index expression mode, and to convert the expression mode of the input data index of the first operation instruction into the default indexing expression mode according to a converting instruction, based on a determination that the expression mode of the input data index of the first operation instruction is not the default expression mode, so as to obtain the input data index of the first operation instruction in the default indexing expression mode; and to screen the input data of the first operation instruction according to the input data index of the first operation instruction in the default indexing expression mode, so as to obtain the input data processed of the first operation instruction.

Optionally, the expression mode of the input data index of the first operation instruction may be a direct indexing expression mode, a step indexing expression mode, a list of List (LIL) expression mode, a coordinate list (COO) expression mode, a compressed sparse row (CSR) expression mode, a compressed sparse column (CSC) expression mode, an Ellpack-ltpack (ELL) expression mode, or a hybrid (HYB) expression mode.

In an implementation, the input data of the first operation instruction is configured as sparse data. When the input data index of the first operation instruction is expressed in the direct indexing expression mode, the input data index of the first operation instruction is a string consisting of 0's and 1's, where the number 0 indicates that an absolute value of an element in the input data of the first operation instruction is less than or equal to a preset threshold, the number 1 indicates that an absolute value of an element in the input data of the first operation instruction is greater than the preset threshold.

Figure 4:
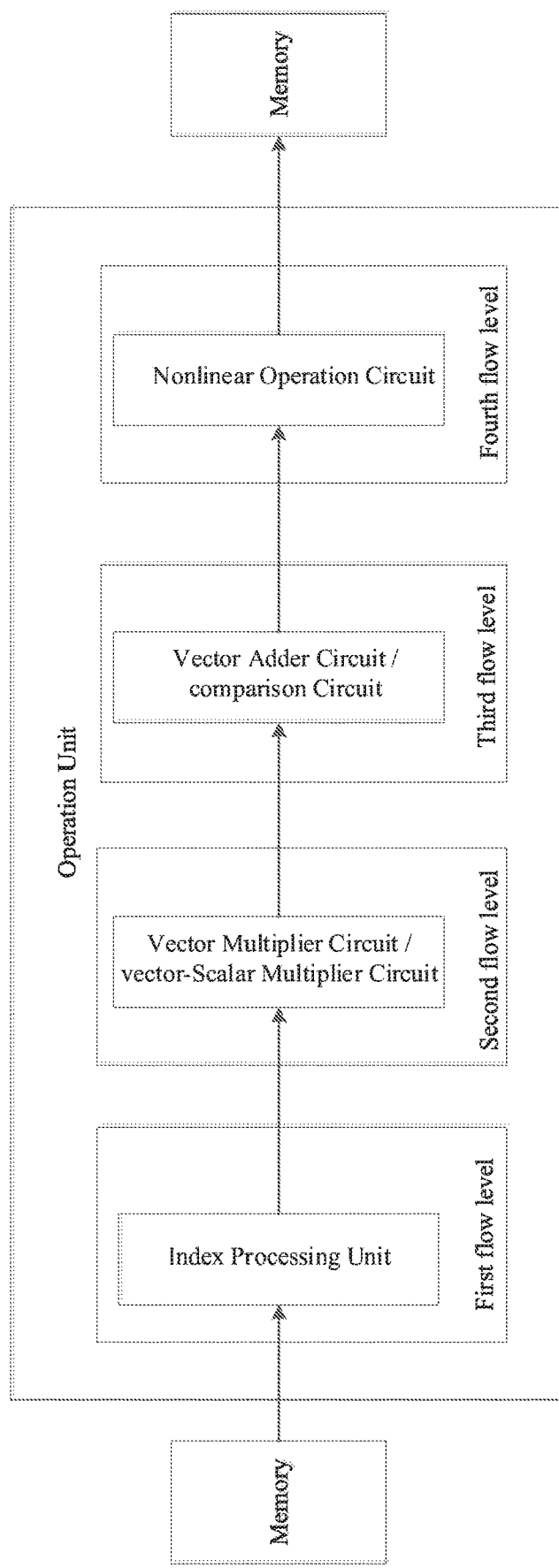
FIG. 4 is a schematic diagram of pipeline stages of an operation unit in an operation module according to an embodiment of the present disclosure.

For example, as illustrated in FIG. 4, assume that the input data of the first operation instruction is a vector (3, 0, 6, 4, 0.1, 0.9), and the preset threshold is 0.5. Since the absolute values of the element 0 and the element 0.1 in the vector are less than the preset threshold, the input data index of the first operation instruction in the direct indexing expression mode is 101101.

In an implementation, the input data of the first operation instruction is configured as sparse data, and when the input data index of the first operation instruction is expressed in the step indexing expression mode, the input data index of the first operation instruction is a string consisting of a distance between an element in the input data of the first operation instruction whose absolute value is larger than the preset threshold between a previous element in the input data of the first operation instruction whose absolute value is larger than the preset threshold. It should be noted that the above-identified distance refers to a difference between a column number of an element in the input data and a column number of another element in the input data.

For example, as illustrated in FIG. 5, assume that the input data of the first operation instruction is a vector (3, 0, 6, 4, 0.1, 0.9), and the preset threshold is 0.5. Since the absolute values of the element 0 and the element 0.1 in the vector are less than the preset threshold, the input data index of the first operation instruction in the step indexing expression mode is 0212.

In an implementation, the input data of the first operation instruction is configured as sparse data, and the input data of the first operation instruction is expressed by a matrix form; when the input data index of the first operation instruction is expressed in the LIL expression mode, the input data index of the first operation instruction includes at least one list, and each of the at least one list includes at least one record, where the record includes a column index of an element in the input data of the first operation instruction whose absolute value is larger than the preset threshold and a value of the element whose absolute value is larger than the preset threshold.

For example, assume that the input data of the first operation instruction is a matrix $$\begin{bmatrix} 2 & 3.5 \\ 0 & 8 \\ 5.8 & 6 \\ 0.3 & 0 \end{bmatrix},$$

and the preset threshold is 0.5. Then the input data index of the first operation instruction in the LIL expression mode is ((1, 2), (2, 3.5), (2, 8), (1, 5.8), (2, 6)).

In an implementation, the input data of the first operation instruction is configured as sparse data, and the input data of the first operation instruction is expressed by a matrix form; when the input data index of the first operation instruction is expressed in the COO expression mode, the input data index of the first operation instruction includes at least one tuple, and the tuple includes a row number and a column number, in a input data matrix of the first operation instruction, of an element in the input data matrix of the first operation instruction whose absolute value is greater than the preset threshold, and a value of the element.

For example, assume that the input data of the first operation instruction is a matrix $$\begin{bmatrix} 2 & 3.5 \\ 0 & 8 \\ 5.8 & 6 \\ 0.3 & 0 \end{bmatrix},$$

and the preset threshold is 0.5. Then the input data index of the first operation instruction in the COO indexing expression mode is ((1, 1, 2), (1, 2, 3.5), (2, 2, 8), (3, 1, 5.8), (3, 2, 6)).

In an implementation, the input data of the first operation instruction is configured as sparse data, and the input data of the first operation instruction is expressed by a matrix form; when the input data index of the first operation instruction is expressed in the CSR expression mode, the input data index of the first operation instruction includes a first array, a second array, and a third array; where the first array is configured to store a value of an element in the input data matrix of the first operation instruction whose absolute value is greater than the preset threshold, the second array is configured to store a column index, in the input data matrix of the first operation instruction, of an element in the input data matrix of the first operation instruction whose absolute value is larger than the preset threshold, the third array is configured to store a sum of the number of elements in each row and the number of elements in the preceding rows of the input data matrix of the first operation instruction whose absolute values are greater than the preset threshold, and a last element in the third array is configured to store the number of elements in the input data matrix of the first operation instruction whose absolute value are greater than the preset threshold.

In the CSR expression mode, row information of the input data matrix of the first operation instruction may be compressed and stored, and only a position of the first element of each row whose absolute value is greater than the preset threshold can be explicitly retained. The input data index of the first operation instruction can be expressed by three arrays.

The first array is configured to store a value of an element in the input data matrix of the first operation instruction whose absolute value is greater than the preset threshold, and each element is arranged in a row traversal mode of left-to-right and top-to-down. The first array is denoted as A. A length of the first array is the number of elements, in the input data matrix of the first operation instruction, whose absolute value are greater than the preset threshold.

The second array is configured to store a column index (i.e., column number), in the input data matrix of the first operation instruction, of an element in the first array A. Thus, a length of the second array is the same as the length of the array A. The second array is denoted as JA.

The third array is denoted as IA, and the number of rows of the input data matrix of the first operation instruction is incremented by one and is configure as a length of the third array. The third array is configured to store a sum of the number of elements in each row and the number of elements in the preceding rows of the input data matrix of the first operation instruction whose absolute values are greater than the preset threshold, which can be obtained by the following recursive method, and the last element in the array IA is configured to store the number of elements in the entire input data matrix of the first operation instruction whose absolute value are greater than the preset threshold.

If the sequence numbers of the above-mentioned three arrays and the input data matrix of the first operation instruction are configured to start from zero, the array IA can be defined by the following recursive method.

IA[0]=0;

IA[i]=IA[i-1]+ the number of elements in the i-1$^{th}$ row of the input data matrix of the first operation instruction whose absolute value are larger than the preset threshold (i>0).

For example, assume that the input data of the first operation instruction is a matrix $$\begin{bmatrix} 0 & 0.2 & 0 & 0 \\ 5 & 8 & 0 & 0 \\ 0 & 0 & 3 & 0 \\ 0 & 6 & 0 & 0 \end{bmatrix},$$

and the preset threshold is 0.5. The input data index of the first operation instruction in the CSR expression mode may be obtained as follows. Since the first array A stores the values of all the elements in the above-mentioned matrix whose absolute value are greater than 0.5 and the storage order is arranged in a row traversal mode of left-to-right and top-to-down, the first array A=[5, 8, 3, 6]. Since the second array JA stores the column index (i.e. the column number) in the above-mentioned matrix of each element of the array A, the array JA=[0, 1, 2, 1]. Since the third array IA is configured to store a sum of the number of elements in each row and the number of elements in the preceding rows of the above-mentioned matrix whose absolute values are greater than the preset threshold 0.5, the array IA=[0, 0, 2, 3, 4] according to the above-mentioned recursive method.

In an implementation, the input data of the first operation instruction is configured as sparse data, and the input data of the first operation instruction is expressed by a matrix form; when the input data index of the first operation instruction is expressed in the CSC expression mode, the input data index of the first operation instruction includes a fourth array, a fifth array, and a sixth array; where the fourth array is configured to store a value of an element in the input data matrix of the first operation instruction whose absolute value is greater than the preset threshold, the fifth array is configured to store a row index, in the input data matrix of the first operation instruction, of an element in the input data matrix of the first operation instruction whose absolute value is larger than the preset threshold, the sixth array is configured to store a sum of the number of elements in each column and the number of elements in the preceding columns of the input data matrix of the first operation instruction whose absolute values are greater than the preset threshold, and a last element in the sixth array is configured to store the number of elements in the input data matrix of the first operation instruction whose absolute value are greater than the preset threshold.

In the CSC expression mode, the row information of the input data matrix of the first operation instruction may be compressed and stored, and only a position of the first element of each column whose absolute value is greater than the preset threshold can be explicitly retained. The input data index of the first operation instruction can be expressed by three arrays.

The fourth array is configured to store a value of an element in the input data matrix of the first operation instruction whose absolute value is greater than the preset threshold, and each element is arranged in a row traversal mode of left-to-right and top-to-down. The fourth array is denoted as A'. A length of the first array is the number of elements in the input data matrix of the first operation instruction whose absolute values are greater than the preset threshold.

The fifth array is configured to store a row index (i.e., row number), in the input data matrix of the first operation instruction, of an element in the fourth array A'. Thus, a length of the fifth array is the same as the length of the array A'. The fifth array is denoted as JA'.

The sixth array is denoted as IA', and the number of columns of the input data matrix of the first operation instruction is incremented by one and is configure as a length of the sixth array. The sixth array is configured to store a sum of the number of elements in each column and the number of elements in the preceding columns of the input data matrix of the first operation instruction whose absolute values are greater than the preset threshold, which can be obtained by the following recursive method, and the last element in the array IA' stores the number of elements whose absolute value are greater than the preset threshold in the entire input data matrix of the first operation instruction.

If the sequence numbers of the above-mentioned three arrays and the input data matrix of the first operation instruction are configured to start from 0, the array IA' can be defined by the following recursive method.

IA'[0]=0;

IA'[j]=IA'[j-1]+ the number of elements in the j-1th column of the input data matrix of the first operation instruction whose absolute value are larger than the preset threshold (j>0)

For example, assume that the input data of the first operation instruction is a matrix $$\begin{bmatrix} 4 & 0 & 0 & 2 \\ 0 & 1 & 0 & 0.3 \\ 0 & 0 & 5 & 7 \\ 6 & 3 & 0 & 8 \end{bmatrix},$$

and the preset threshold is 0.5. Then the input data index of the first operation instruction in the CSC indexing expression mode may be obtained as follows Since the fourth array A stores the values of all the elements in the above-mentioned matrix whose absolute value is greater than 0.5 and the storage order is arranged in a column traversal mode of left-to-right and top-to-down, the first array A' =[4,6,1, 3,5,2,7,8]. Since the fifth array JA' stores the row index (i.e., the row number), in the input data matrix of the first operation instruction, of each element of the array A, the array JA'=[0, 3, 1, 3, 2, 0, 2, 3]; the sixth array IA'=[0, 2, 4, 5, 8] according to the above-mentioned recursive method.

In an implementation, the input data of the first operation instruction is configured as sparse data, and the input data of the first operation instruction is expressed by a matrix form; when the input data index of the first operation instruction is expressed in the ELL expression mode, the input data index of the first operation instruction includes a first matrix and a second matrix; where the first matrix is configured to store a column number, in the input data matrix of the first operation instruction, of an element in the input data matrix of the first operation instruction whose absolute value is greater than the preset threshold, the second matrix is configured to store a value of an element whose absolute value is greater than the preset threshold.

The above-mentioned expression mode employs two matrices, with the same number of rows as the input data matrix of the first operation instruction, to store information of elements in the input data matrix of the first operation instruction whose absolute value are greater than the preset threshold. The first matrix is configured stores the column numbers of elements whose absolute value are greater than the preset threshold in the input data matrix of the first operation instruction. The second matrix is configured to store the values of elements whose absolute value are greater than the preset threshold in the input data matrix of the first operation instruction, where the row numbers in the input data matrix of those elements are not stored but represented by the row numbers in the second matrix of those elements. Each of these two matrices is stored from the first position, and if there are no elements, it ends with an end marker (such as *).

For example, assume that the input data of the first operation instruction is a matrix $$\begin{bmatrix} 2 & 3.5 \\ 0 & 8 \\ 5.8 & 6 \\ 0.3 & 0 \end{bmatrix},$$

and the preset threshold is 0.5. Then the input data index of the first operation instruction in the ELL indexing expression mode may be denoted as follows. The first matrix is $$\begin{bmatrix} 0 & 1 \\ 1 & * \\ 0 & 1 \\ * & * \end{bmatrix};$$

the second matrix is $$\begin{bmatrix} 2 & 3.5 \\ 8 & 0 \\ 5.8 & 6 \\ 0 & 0 \end{bmatrix}.$$

In an implementation, the input data of the first operation instruction is configured as sparse data, and the input data of the first operation instruction is expressed by a matrix form; when the input data index of the first operation instruction is expressed in the HYB expression mode, the input data index of the first operation instruction includes a third matrix, a fourth matrix, and at least one tuple; where the fourth matrix is configured to store a largest identical number of elements of each row in the input data matrix of the first operation instruction whose absolute values are greater than the preset threshold, the third matrix is configured to store a column number, in the input data matrix of the first operation instruction, of an element stored in the fourth matrix whose absolute value is greater than the preset threshold, each tuple of the at least one tuple is configured to store a row number, a column number, and a value of an additional element of each row of the input data matrix of the first operation instruction with respect to other rows. It should be noted that the above-identified the largest identical number refers to a smallest number among the numbers of the elements of each row of the input data matrix of the first operation instruction whose absolute value is greater than the preset threshold. The above-identified additional element refers to an element of each row of the input data matrix of the first operation instruction whose absolute value is greater than the preset threshold, but is not stored in the fourth matrix.

This above-identified expression mode can be regarded as a combination of the ELL expression mode and the COO expression mode. The COO expression mode is configured to store an additional element, whose absolute value is greater than the preset threshold, of each row of the input data matrix of the first operation instruction with respect to other rows. The ELL expression mode is configured to store a largest identical number of elements of each row in the input data matrix of the first operation instruction whose absolute values are greater than the preset threshold.

Assume that the input data of the first operation instruction is a matrix $$\begin{bmatrix} 1 & 7 & 0 & 0 \\ 0 & 2 & 8 & 0 \\ 5 & 0 & 3 & 9 \\ 0 & 6 & 0 & 4 \end{bmatrix},$$

and the preset threshold is 0.5. Then the input data index of the first operation instruction in the ELL indexing expression mode can be denoted as follows: the third matrix is $$\begin{bmatrix} 0 & 1 \\ 1 & 2 \\ 0 & 2 \\ 1 & 3 \end{bmatrix};$$

the forth matrix is $$\begin{bmatrix} 1 & 7 \\ 2 & 8 \\ 5 & 3 \\ 6 & 4 \end{bmatrix};$$

the tuple in COO expression mode is (2,3,9).

Optionally, the default indexing expression mode may be the direct indexing expression mode, the step indexing expression mode, the LIL expression mode, the COO expression mode, the CSC expression mode, the CSR expression mode, the ELL expression mode, or the HYB expression mode.

It should be noted that the default indexing expression mode may be the direct indexing expression mode, the step indexing expression mode, the LIL expression mode, the COO expression mode, the CSC expression mode, the CSR expression mode, the ELL expression mode, or the HYB expression mode, whose detailed description can refer to related description above and will not be described herein.

The operation unit 104 is configured to execute the following prior to operating the input data according to the first operation instruction. The operation unit 104 converts the expression mode of the input data index of the first operation instruction from the current non-default indexing expression mode to the default indexing expression mode according to conversion instruction. The step indexing expression mode is defined as the default indexing expression mode herein.

In an embodiment, the expression mode of the input data index of the first operation instruction is the direct indexing expression mode. The operation unit 104 converts the expression mode of the input data index of the first operation instruction from the direct indexing expression mode to the step indexing expression mode according to the first conversion instruction.

The first conversion instruction is: DIRECT2STTP (D_TYPE, Nnz, InX, ValX, InY, ValY). The function description of each variable in this instruction is illustrated in Table 1 below.

TABLE 1

| Variable | Description of the function |
|---|---|
| D_TYPE | A type of data to be manipulated, supporting real numbers and complex numbers |
| Nnz | The number of data whose absolute value are greater than the preset threshold in data to be converted |
| InX | A head address of direct index of data to be converted |
| ValX | A head address of value of data to be converted |
| InY | A head address of step index of data converted |
| ValY | A head address of value of data converted |

In an embodiment, the expression mode of the input data index of the first operation instruction is the COO expression mode. The operation unit 104 converts the expression mode of the input data index of the first operation instruction from the COO expression mode to the step indexing expression mode according to the second conversion instruction.

The second conversion instruction is: COO2STTP (D_TYPE, LAYOUT, Nnz, InXi, InYi, ValX, InY, ValY). The function description of each variable in this instruction is illustrated in Table 2 below.

TABLE 2

| Variable | Description of the function |
|---|---|
| D_TYPE | A type of data to be manipulated, supporting real numbers and complex numbers |
| LAYOUT | Matrix storage format (including row-major order and column-major order) |
| Nnz | The number of data whose absolute value are greater than the preset threshold in data to be converted |
| InXi | A head address of row coordinate of data to be converted |
| InYj | A head address of column coordinate of data to be converted |
| ValX | A head address of value of data to be converted |
| InY | A head address of step index of data converted |
| ValY | A head address of value of data converted |

In an embodiment, the expression mode of the input data index of the first operation instruction is the CSR expression mode. The operation unit 104 converts the expression mode of the input data index of the first operation instruction from the CSR expression mode to the step indexing expression mode according to the second conversion instruction.

The second conversion instruction is: CSR2STTP (D_TYPE, Nnz, InXr, InYc, ValX, InY, ValY). The function description of each variable in this instruction is illustrated in Table 3 below.

TABLE 3

| Variable | Description of the function |
|---|---|
| D_TYPE | A type of data to be manipulated, supporting real numbers and complex numbers |
| Nnz | The number of data whose absolute value is greater than the preset threshold in data to be converted |
| InXr | A head address of row index of data to be converted |
| InYc | A head address of column index of data to be converted |
| ValX | Ahead address of value of data to be converted |
| InY | A head address of step index of data converted |
| ValY | A head address of value of data converted |

The operation unit 104 converts the expression mode of the input data index of the first operation instruction from a current non-default indexing expression mode to the default indexing expression mode according to the conversion instruction. The operation unit 104 then screens the input data of the first operation instruction to obtain the screened input data of the first operation instruction, according to the input data index of the first operation instruction, which is expressed by the default indexing expression mode.

Specifically, the input data of the first operation instruction include first input data and second input data. The operation unit 104 obtains an index of the first input data and an index of the second input data respectively, according to which a third index can be obtained. In the case that the first input data index and the second input data index are in the direct indexing expression mode, the operation unit 104 performs an AND operation on the first input data index and the second input data index to obtain the third index, which is also in the direct indexing expression mode. In the case that the first input data index is in the direct indexing expression mode and the second input data index is in the step indexing expression mode, the operation unit 104 converts the expression mode of the second input data index from the step indexing expression mode to the direct indexing expression mode, and then performs an AND operation on the first input data index and the converted second input data index to obtain the third index, which is also in the direct indexing expression mode. The operation unit 104 screens the first input data and the second input data according to the third index, so as to obtain the first input data screened and the screened second input data screened. The operation unit 104 calculates the first input data screened and the screened second input data screened according to the first operation instruction.

Optionally, the operation unit 104 is configured to perform operation instructions (including the first operation instruction and the second operation instruction) to process input data (including input data of the first operation instruction and input data of the second operation instruction) as follows. Perform operation on the sparse input data directly, and perform operation after processing another data to be operated according to the sparse input data index, etc.

Specifically, in the case that the input data of the operation instruction include a scalar and a vector/a matrix, that is, the operation instruction is configured to perform an operation between the scalar and the vector/the matrix, the operation unit 104 directly performs operations on the scalar and the vector/the matrix. In the case that the operation instruction is an instruction to be operated on at least two vectors/matrices, and at least one of the at least two vectors/matrices is a sparse vector/sparse matrix, the operation unit 104 performs operation after screening the data of the non-sparse vector/matrix according to the index of the sparse matrix/vector. In the case that the index expression mode of the sparse vector/matrix is not the expression mode corresponding to a hardware operation part (i.e. the index expression mode of the sparse vector/matrix is not the default indexing expression mode), the operation unit 104 converts the index of the sparse vector/matrix from the non-default indexing expression mode to the default indexing expression mode, and then performs the subsequent operations.

For example, an operation may be performed between a scalar and a sparse matrix, F=a A, where a is a scalar and A is a sparse matrix. Then the operation unit 104 performs an operation directly on the sparse data A. For another example, F=AB, where A is a sparse matrix and B is a dense matrix. The operation unit 104=screens the elements of the dense matrix B according to the index of the sparse matrix A to obtain the elements operating with the sparse matrix A, and then performs the subsequent operations.

In an embodiment, the memory 101 may be a scratchpad memory.

In an embodiment, the circuit unit inside the operation unit 104 is configured as a multi-pipeline architecture. As illustrated in FIG. 4, the circuit unit inside the operation unit 104 is divided into four pipeline stages.

The first pipeline stage includes but is not limit to index processing units; the second pipeline stage includes but is not limit to a vector multiplier circuit, a vector-scalar multiplier circuit, etc; the third pipeline stage includes but is not limit to a comparison circuit (such as a comparator), a vector adder circuit, etc; the forth pipeline stage includes but is not limit to a nonlinear operation circuit (such as a activation circuit or a transcendental function computation circuit), etc.

In an embodiment, the operation unit 104 further includes a conversion unit, which can be positioned on the second pipeline stage, or the forth pipeline stage, or the second pipeline stage and the forth pipeline stage (i.e., both the second pipeline stage and the forth pipeline stage have conversion circuits).

In an embodiment, the operation unit 100 further includes a dependency relationship processing unit 103.

The dependency relationship processing unit 103 is configured to determine whether input data accessed by the extension instruction is the same as that accessed by a previous extension instruction prior to acquiring the extension instruction by the control unit 105; where a first operation instruction and a second operation instruction of a current extension instruction are provided to the operation unit 104 when the previous extension instruction have been executed based on a determination that the input data accessed by the extension instruction is the same as that accessed by the previous extension instruction, and the first operation instruction and the second operation instruction of the current extension instruction are provided to the operation unit 104 based on a determination that the input data accessed by the extension instruction is not the same as that accessed by the previous extension instruction.

The dependency relationship processing unit 103 is further configured to store the current extension instruction in a memory queue when the input data accessed by the extension instruction is the same as that accessed by the previous extension instruction, and to provide the current extension instruction in the memory queue to the control unit 105 when the previous extension instruction have been executed.

Optionally, the execution sequence may be out of order, forward order or reverse order.

It should be noted that, the execution sequence is out of order, that is, the first operation instruction and the second operation instruction do not have a sequential execution order, the execution sequence is forward order, that is, the first operation instruction is executed first, and then the second operation instruction is executed; the execution sequence is reversed order, that is, the second operation instruction is executed first, and then the first operation instruction is executed.

The operation unit 100 is configured to determine the above-mentioned execution sequence as follows, according to the first operation instruction and the second operation instruction. The operation unit 100 may determine whether an output data of the first operation instruction is the same as the input data of the second operation instruction, and determine that the execution sequence is in forward order based on a determination that the input data of the first operation instruction is the same as the output data of the second operation instruction. The operation unit 100 may determine whether the input data of the first operation instruction is the same as the output data of the second operation instruction, and determine that the execution sequence is in reverse order based on a determination that the input data of the first operation instruction is the same as the output data of the second operation instruction. The operation unit 100 may determine whether the input data of the first operation instruction is associated with the output data of the second operation instruction, and determine that the execution sequence is out of order based on a determination that the input data of the first operation instruction is not associated with the output data of the second operation instruction. The operation unit 100 may determine whether the output data of the first operation instruction is associated with the input data of an second operation instruction, and determine that the execution sequence is out of order based on a determination that the output data of the first operation instruction is not associated with the input data of an second operation instruction.

Specifically, for example, F=A*B+C, where F, A, B, and C are all matrices, the first operation instruction is a matrix multiplication instruction, and the second operation instruction is a matrix addition instruction. Since the matrix addition instruction of the second operation instruction needs to employ the result (i.e., the output data) of the first operation instruction, a determination may be made that the execution sequence is forward order. For another example, F=OP(A)*OP(B), where F, A and B are all matrices, the first operation instruction is a matrix multiplication instruction, and the second operation instruction is a transformation (for example, a transposition or a conjugate). Since the input data of the first operation instruction is the output data of the second operation instruction, a determination may be made that the execution sequence is reverse order. If there is no corresponding association, that is, the output data of the first operation instruction is different from the input data of the second operation instruction, and the input data of the first operation instruction is different from the input data of the second calculation instruction, it is determined not to be associated.

The extension of the vector instruction according to the present disclosure, is capable of strengthening the function of the instruction, and replacing original multiple instructions with one instruction, thereby reducing the number of instructions required for operations of complex vectors or matrices and simplifying using processes of vector instructions. Compared to multiple instructions, there is no need to store intermediate results, which can save storage space and avoid additional reading and writing overhead.

For example, in the case that the first operation instruction is a vector instruction, and the input data in the vector instruction is a vector or a matrix, the instruction adds a function of scaling the input data, that is, adding an operand indicating a scaling coefficient in the opcode domain. When the input data is read in, is the input data may be scaled first according to the scaling coefficient (i.e. the second operation instruction is a scaling instruction) (i.e. there is no need to transform the sparse matrix). If there are multiple vectors or matrix multiplication operations in the vector instruction, the scaling coefficients corresponding to these input vectors or matrices can be combined into one.

For example, in the case that the first operation instruction is a vector instruction, and the input data in the vector instruction is a matrix, the instruction may add a function of transposing the input data (i.e. the second operation instruction is a transposing instruction). An operand, indicating whether to transpose the input data, is added to the instruction, and is configured to determine whether transform the input data prior to the operation.

For example, in the case that the first operation instruction is a vector instruction, for the output vector or matrix in the vector instruction, the instruction may add a function of adding an original input vector or matrix (i.e. the second operation instruction is an adding instruction). A coefficient, indicating scaling the original output vector or matrix, is added into the instruction (i.e., adding a third operation instruction which may be a scaling instruction), and the instruction indicates that after performing an operation on the vector or matrix, the result may be added to the vector or matrix scaled to form a new output vector or matrix.

For example, in the case that the first operation instruction is a vector instruction, and the input data in the vector instruction is a vector, the vector instruction may add a function of reading results in a fixed step size. An operand, indicating a reading step size of the input data, is added to the vector instruction (i.e. the second operation instruction is configured to read a vector instruction in a fixed step size), and is configured to indicate a difference between addresses of two adjacent elements in the vector.

For example, in the case that the first operation instruction is a vector instruction, for a result vector of the vector instruction, the vector instruction may add a function of writing results in a fixed step size (i.e., the second operation instruction is configured to write the vector instruction in a fixed step size). An operand, indicating a writing step size of the output vector, is added to the vector instruction, and is configured to indicate a difference between the addresses of two adjacent elements in the vector. If a vector is configured as both an input vector and a result vector, the vector is configured to employ the same step size for both as an input vector and as a result vector.

For example, if the first operation instruction is a vector instruction, for an input matrix of the vector instruction, the vector instruction may add a function of reading row vectors or column vectors in a fixed step size (i.e., the second operation instruction is configured to write multiple vectors in a fixed step size). An operand, indicating a reading step size of the matrix, is added to the vector instruction, and id configured to indicate a difference between the head addresses of the row vector and the column vector of the matrix.

For example, if the first operation instruction is a vector instruction, for the result matrix of the vector instruction, the vector instruction may add a function of reading row vectors or column vectors in a fixed step size (i.e., the second operation instruction is configured to write multiple vectors in a fixed step size). An operand, indicating a reading step size of the matrix, is added to the vector instruction, and is configured to indicate a difference between the head addresses of the row vector and the column vector of the matrix. If a matrix is configured as both an input matrix and a result matrix, the matrix is configured to employ the same step size for both as an input matrix and as a result matrix.

The actual structure of the above-mentioned extension instructions are described hereinafter in reference to some actual extension instructions. The default indexing expression mode employed herein is the step indexing expression mode.

A plane rotation, refers to a coordinate transformation for multiple points in a plane. Given two vectors x and y, each element of the two vectors is transformed according to the following formula.

$$xi = c*xi + s*yi$$

$$yi = c*yi - s*xi$$

In the case that the above-mentioned vector x is a sparse vector, for the plane rotation, the corresponding extension instruction is: ROT (D_TYPE, I_TYPE, Nnz, ValX, InX, M, Y, INCY, A). The meanings of the variables in the above-mentioned ROT instruction are illustrated in Table 4 below.

TABLE 4

| Variable | Description of the function |
| --- | --- |
| D_TYPE | A type of data to be manipulated, supporting real numbers and imaginary numbers |
| I_TYPE | A index expression mode of the sparse vector |
| Nnz | The number of elements in the sparse vector x |
| ValX | A head address of elements in the sparse vector x |
| InX | A head address of an index of the sparse vector x |
| M | A length of the vector y (the number of elements in the vector y ) |
| Y | A head address of elements in the sparse vector y |
| INCY | An address interval of elements in the sparse vector y |
| C | Scalar |
| S | Scalar |

In the case that both the vector x and the vector y are sparse vectors, for the plane rotation, the corresponding extension instruction is: ROT (D_TYPE, I_TYPE, Nnz, ValX, InX, Mnz, ValY, InY, C, S). The meanings of the variables in the above-mentioned ROT instruction are illustrated in Table 5 below.

TABLE 5

| Variable | Description of the function |
| --- | --- |
| D_TYPE | A type of data to be manipulated, supporting real numbers and imaginary numbers |
| I_TYPE | A index expression mode of the sparse vector |
| Nnz | The number of elements in the sparse vector x |
| ValX | A head address of elements in the sparse vector x |
| InX | A head address of an index of the sparse vector x |
| Mnz | the number of elements in the sparse vector y |
| ValY | A head address of elements in the sparse vector y |
| InY | An address interval of elements in the sparse vector y |
| C | Scalar |
| S | Scalar |

The formats of the extension instructions illustrated in Tables 4 and 5 respectively indicate the case that the vectors to be operated (the vector x and the vector y) in which one of the vectors is a sparse vector or two of the vectors are sparse vectors. The length of the two vectors is variable, which can reduce the number of instructions and simplify the using of instructions.

In addition, a vector format stored at a certain interval can be supported, which can avoid the execution overhead of transforming vector formats and the space occupation of storing intermediate results. Multiple index expression modes can also be supported, thereby the compatibility is higher. Complex operation can also be supported, which can expand the instruction function and facilitates expanding the applicable scope of the instructions.

A Given's rotation, refers to a Given's rotation operation on multiple points in a plane. Given two vectors x and y, each element of the two vectors is transformed according to the following formula.

$$\begin{bmatrix} x_i \\ y_i \end{bmatrix} = H \begin{bmatrix} x_i \\ y_i \end{bmatrix}$$

Where H is a given Given's transformation matrix, whose elements are given by instruction parameters.

In the case that the above-mentioned vector x is a sparse vector, for the Given's rotation, the corresponding extension instruction is: ROTM (D_TYPE, I_TYPE, Nnz, VaiX, InX, M, Y, INCY, FLAG, PARAM). The meanings of the variables in the above-mentioned ROTM instruction are illustrated in Table 6 below.

TABLE 6

| Variable | Description of the function |
|---|---|
| D_TYPE | A type of data to be manipulated, supporting real numbers and imaginary numbers |
| I_TYPE | An index expression mode of the sparse vector |
| Nnz | The number of elements in the sparse vector x |
| ValX | A head address of elements in the sparse vector x |
| InX | A head address of an index of the sparse vector x |
| M | A length of the vector y (the number of elements in the vector y) |
| Y | A head address of elements in the sparse vector y |
| INCY | An address interval of elements in the sparse vector y |
| FLAG | Parameter flag, indicating the type of parameter |
| PARAM | Indicating the elements of the matrix H, which are $h_{11}$, $h_{12}$, $h_{21}$, $h_{22}$. Under different flags, the elements of H are defined as follows. |
| | In case of FLAG = −1.0, $H = \begin{bmatrix} h_{11} & h_{12} \\ h_{21} & h_{22} \end{bmatrix}$ |
| | In case of FLAG = 0.0, $H = \begin{bmatrix} 1.0 & h_{12} \\ h_{21} & 1.0 \end{bmatrix}$ |
| | In case of FLAG = 1.0, $H = \begin{bmatrix} h_{11} & 1.0 \\ -1.0 & h_{22} \end{bmatrix}$ |
| | In case of FLAG = −2.0, $H = \begin{bmatrix} 1.0 & 0.0 \\ 0.0 & 1.0 \end{bmatrix}$ |

In the case that both the vector x and the vector y are sparse vectors, for the Given's rotation, the corresponding extension instruction is: ROTM (D_TYPE, I_TYPE, Nnz, ValX, InX, Mnz, ValY, InY, FLAG, PARAM). The meanings of the variables in the above-mentioned ROTM instruction are illustrated in Table 7 below.

TABLE 7

| Variable | Description of the function |
|---|---|
| D_TYPE | A type of data to be manipulated, supporting real numbers and imaginary numbers |
| I_TYPE | An index expression mode of the sparse vector |
| Nnz | The number of elements in the sparse vector x |
| ValX | A head address of elements in the sparse vector x |
| InX | A head address of an index of the sparse vector x |
| Mnz | The number of elements in the sparse vector y |
| ValY | A head address of elements in the sparse vector y |
| InY | A head address of an index of the sparse vector y |
| FLAG | Parameter flag, indicating the type of parameter |
| PARAM | Indicating the elements of the matrix H, which are $h_{11}$, $h_{12}$, $h_{21}$, $h_{22}$. Under different flags, the elements of H are defined as follows. |
| | In case of FLAG = −1.0, $H = \begin{bmatrix} h_{11} & h_{12} \\ h_{21} & h_{22} \end{bmatrix}$ |
| | In case of FLAG = 0.0, $H = \begin{bmatrix} 1.0 & h_{12} \\ h_{21} & 1.0 \end{bmatrix}$ |
| | In case of FLAG = 1.0, $H = \begin{bmatrix} h_{11} & 1.0 \\ -1.0 & h_{22} \end{bmatrix}$ |
| | In case of FLAG = −2.0, $H = \begin{bmatrix} 1.0 & 0.0 \\ 0.0 & 1.0 \end{bmatrix}$ |

The formats of the extension instructions above-mentioned illustrated in Tables 6 and 7 respectively indicate that the vectors to be operated (the vector x and the vector y) in which one of the vectors is a sparse vector or two of the vectors are sparse vectors. The length of the two vectors is variable, which can reduce the number of instructions and simplify the using of instructions. In addition, the vector format stored at a certain interval can be supported, which can avoid the execution overhead of transforming vector formats and the space occupation of storing intermediate results. Multiple index expression modes can also be supported, thereby the compatibility is higher. Complex operation can also be supported, which can expand the instruction function and facilitates expanding the applicable scope of the instructions. Moreover, it can differentiate the normal format and special format of the Given's rotation, which not only ensures versatility, but also facilitates optimization of special situations.

Vector exchange, refers to exchange elements of two vectors. Given two sparse vectors x and y, swap the elements in the vector x and the vector y. The corresponding extension instruction is: SWAP (D_TYPE, I_TYPE, Nnz, VaiX, InX, Mnz, ValY, InY,). The meanings of the variables in the above-mentioned SWAP instruction are illustrated in Table 8 below.

TABLE 8

| Variable | Description of the function |
|---|---|
| D_TYPE | A type of data to be manipulated, supporting real numbers and imaginary numbers |
| I_TYPE | An index expression mode of the sparse vector |
| Nnz | The number of elements in the sparse vector x |
| ValX | A head address of elements in the sparse vector x |
| InX | A head address of an index of the sparse vector x |
| Mnz | A number of elements in the sparse vector y |
| ValY | A head address of elements in the sparse vector y |

TABLE 8-continued

| Variable | Description of the function |
|---|---|
| InY | A head address of an index of the sparse vector y |

The formats of the extension instructions above-mentioned illustrated in Tables 8 indicate the case that both the vectors to be operated (the vector x and the vector y) are sparse vectors. The length of the two vectors is variable, which can reduce the number of instructions and simplify the use of instructions. Multiple index expression modes can be supported, thereby the compatibility is higher. Complex operation can also be supported, which can expand the instruction function and facilitate expanding the applicable scope of the instructions.

Vector scaling, refers to calculate the result of multiplying a vector by a scalar. Given a sparse vectors x and a scalar y, the instruction calculates the result of multiplying the vector x by the scalar y.

x=a*x

For vector scaling, the corresponding extension instruction is: SCAL (D_TYPE, I_TYPE, Nnz, ValX, InX, A). The meanings of the variables in the above-mentioned SWAP instruction are illustrated in Table 9 below.

TABLE 9

| Variable | Description of the function |
|---|---|
| D_TYPE | A type of data to be manipulated, supporting real numbers and imaginary numbers |
| I_TYPE | An index expression mode of the sparse vector |
| Nnz | The number of elements in the sparse vector x |
| ValX | A head address of elements in the sparse vector x |
| InX | A head address of an index of the sparse vector x |
| A | scalar |

Vector copy, refers to copy one vector into another. Given two sparse vectors x and y, the instruction copies the elements in the vector x into the vector y. The corresponding extension instruction is: COPY (D_TYPE, I_TYPE, Nnz, ValX, InX, Mnz, ValY, InY, A). The meanings of the variables in the above-mentioned SWAP instruction are illustrated in Table 10 below.

TABLE 10

| Variable | Description of the function |
|---|---|
| D_TYPE | A type of data to be manipulated, supporting real numbers and imaginary numbers |
| I_TYPE | An index expression mode of the sparse vector |
| Nnz | The number of elements in the sparse vector x |
| ValX | A head address of elements in the sparse vector x |
| InX | A head address of an index of the sparse vector x |
| Mnz | The number of elements in the sparse vector y |
| ValY | A head address of elements in the sparse vector y |
| InY | A head address of an index of the sparse vector y |
| A | Scalar |

The formats of the extension instructions above-mentioned illustrated in Table 10 indicate the case that both the vectors to be operated (the vector x and the vector y) are sparse vectors. The length of the two vectors is variable, which can reduce the number of instructions and simplify the use of instructions. In addition, multiple index expression modes can be supported, thereby the compatibility is higher. Complex operation can also be supported, which can expand the instruction function and facilitate expanding the applicable scope of the instructions.

Vector element copy, refers to an extension instruction that, when executed, causes the operation unit 104 to copy one or more specified elements from a specified position of a vector x to another specified position of a vector y. The corresponding extension instruction is: COPY (D_TYPE, I_TYPE, Nnz, ValX, InX, Mnz, ValY, InY, A). The meanings of the variables in the above-mentioned SWAP instruction are illustrated in Table 10.1 below.

TABLE 10.1

| Variable | Description of the function |
|---|---|
| D_TYPE | A type of data to be manipulated, supporting real numbers and imaginary numbers |
| I_TYPE | An index expression mode of the sparse vector |
| Nnz | The number of elements from a head address in the sparse vector x |
| ValX | A head address of elements in the sparse vector x |
| InX | A head address of an index of the sparse vector x |
| ValY | A head address of elements in the sparse vector y |
| InY | A head address of an index of the sparse vector y |
| Mnz | The number of elements from a head address |
| a | A count of elements to be copied after Nnz elements |

In an example, the operation unit 104 may be configured to copy a number of elements (indicated by a in Table 10.1) from a specified position (indicated by Nnz in Table 10.1) of a vector x to a specified position (indicated by Mnz) of a vector y. The vector x and/or the vector y, in some examples, may be a sparse vector or sparse vectors.

Vector multiply-add, refers to calculate the product of a vector and a scalar and add the result to another vector. Given a vectors x, a vectors y and a scalar a, the instruction performs the following vector-vector operation:

y:=a*x+y.

In the case that the vector x is a sparse vector, for vector multiply-add, the corresponding extension instruction is: SAXPY (D_TYPE, I_TYPE, Nnz, ValX, InX, M, Y, INCY, A). The meanings of the variables in the above-mentioned SAXPY instruction are illustrated in Table 11 below.

TABLE 11

| Variable | Description of the function |
|---|---|
| D_TYPE | A type of data to be manipulated, supporting real numbers and imaginary numbers |
| I_TYPE | An index expression mode of the sparse vector |
| Nnz | The number of elements in the sparse vector x |
| ValX | A head address of elements in the sparse vector x |
| InX | A head address of an index of the sparse vector x |
| M | The number of elements in the sparse vector y |
| Y | A head address of elements in the sparse vector y |
| INCY | An address interval between elements in the vector y |
| A | Scalar a, used to store the results of the calculation |

In the case that both the vector x and the vector y are sparse vectors, for vector multiply add, the corresponding extension instruction is: SAXPY (D_TYPE, I_TYPE, Nnz, VaiX, InX, Mnz, ValY, InY, A). The meanings of the variables in the above-mentioned SAXPY instruction are illustrated in Table 12 below.

TABLE 12

| Variable | Description of the function |
| --- | --- |
| D_TYPE | A type of data to be manipulated, supporting real numbers and imaginary numbers |
| I_TYPE | An index expression mode of the sparse vector |
| Nnz | The number of elements in the sparse vector x |
| ValX | A head address of elements in the sparse vector x |
| InX | A head address of an index of the sparse vector x |
| Mnz | The number of elements in the sparse vector y |
| ValY | A head address of elements in the sparse vector y |
| InY | a head address of an index of the sparse vector y |
| A | Scalar a, used to store the results of the calculation |

The formats of the extension instructions illustrated in Table 11 and Table 12 respectively indicate cases that one of the vectors (vector x and vector y) is a sparse vector and both vectors are sparse vectors. The length of the two vectors is variable, which can reduce the number of instructions and simplify the using of instructions.

In addition, the vector format stored at a certain interval can be supported, which can avoid an execution overhead of transforming the vector formats and the space occupation of storing the intermediate results. Multiple index expression modes of the sparse vector can also be supported, thereby the compatibility is higher and facilitate expanding the applicable scope of the instructions.

Vector dot product, refers to calculate a dot product of vectors. Given a vector x, a vector y and a scalar r, perform the following vector-vector operation.

$$r = \sum_{i=1}^{n} X_i * y_i$$

In the case that the vector x is a sparse vector, for the vector dot product, the corresponding extension instruction is: SDOT (D_TYPE, I_TYPE, Nnz, ValX, InX, M, Y, INCY, R). The meaning of each variable in the above-mentioned SDOT instruction is illustrated in Table 13 below.

TABLE 13

| Variable | Description of the function |
| --- | --- |
| D_TYPE | A type of data to be manipulated, supporting real numbers and imaginary numbers |
| I_TYPE | An index expression mode of the sparse vector |
| Nnz | The number of elements in the sparse vector x |
| ValX | A head address of elements in the sparse vector x |
| InX | A head address of an index of the sparse vector x |
| M | A length of the vector y ( i.e., the number of elements in the vector y) |
| Y | A head address of elements in the vector y |
| INCY | An address interval between elements in the vector y |
| R | Scalar r, used to store the results of the calculation |

In the case that the above-mentioned vector x and vector y are sparse vectors, for vector multiply add, the corresponding extension instruction is: SDOT (D_TYPE, I_TYPE, Nnz, ValX, InX, Mnz, ValY, InY, R). The meaning of each variable in the SDOT instruction is illustrated in Table 14 below.

TABLE 14

| Variable | Description of the function |
| --- | --- |
| D_TYPE | A type of data to be manipulated, supporting real numbers and imaginary numbers |
| I_TYPE | An index expression mode of the sparse vector |
| Nnz | The number of elements in the sparse vector x |
| ValX | A head address of elements in the sparse vector x |
| InX | A head address of an index of the sparse vector x |
| Mnz | The number of elements in the sparse vector y |
| ValY | A head address of elements in the sparse vector y |
| InY | A head address of an index of the sparse vector y |
| R | Scalar r, used to store the results of the calculation |

The formats of the extension instruction illustrated in Table 13 and Table 14 respectively indicate cases that one of the vectors (vector x and vector y) is a sparse vector and both vectors are sparse vectors. The length of the two vectors is variable, which can reduce the number of instructions and simplify the using of instructions.

In addition, the vector formats stored at a certain interval can be supported, which can avoid an execution overhead of transforming the vector formats and the space occupation of storing the intermediate results. Multiple index expression modes of the sparse vector can also be supported, thereby the compatibility is higher and facilitate expanding the applicable scope of the instructions.

Vector norm, refers to calculate the Euclidean norm of the sparse vectors. This instruction is configured to perform the following vector protocol operation.

$$r = \|x\| = \sqrt[2]{\sum_{i=1}^{n} x_i^2}$$

The X is a sparse vector, and the r is a scalar for storing the result of the above-mentioned calculation. The extension instruction for calculating the Euclidian norm of the sparse vector x is: NORM2 (D_TYPE, I_TYPE, Nnz, ValX, InX, R). The meaning of each variable in the above NORM2 instruction is illustrated in the Table 15 bellow.

TABLE 15

| Variable | Description of the function |
| --- | --- |
| D_TYPE | A type of data to be manipulated, supporting real numbers and imaginary numbers |
| I_TYPE | An index expression mode of the sparse vector |
| Nnz | The number of elements in the sparse vector x |
| ValX | A head address of elements in the sparse vector x |
| InX | A head address of an index of the sparse vector x |
| R | Scalar r, used to store the Euclidean norm result of the vector x |

As illustrated in Table 15, the length of a vector in the instruction formats is variable, which can reduce the number of instructions and simplify the using of instructions. In addition, the vector format stored at a certain interval can be supported, which can avoid an execution overhead of transforming vector formats and the space occupation of storing intermediate results. Multiple index expression modes of the sparse vector can also be supported, thereby the compatibility is higher and facilitates expanding the applicable scope of the instructions.

Vector sum, refers to calculate a sum of all elements of the sparse vector. This instruction is configured to perform the following vector protocol operation.

$$r=\sum_{i=1}^{n}x_i$$

The x is a sparse vector, and the r is a scalar for storing the result of the calculation. The extension instruction for calculating the sum of the elements of the above-mentioned sparse vector is: ASUM (D_TYPE, I_TYPE, Nnz, ValX, InX, R). The meaning of each variable in the NORM2 instruction is illustrated in the Table 16 bellow.

TABLE 16

| Variable | Description of the function |
| --- | --- |
| D_TYPE | A type of data to be manipulated, supporting real numbers and imaginary numbers |
| I_TYPE | An index expression mode of the sparse vector |
| Nnz | The number of elements in the sparse vector x |
| ValX | A head address of elements in the sparse vector x |
| InX | A head address of an index of the sparse vector x |
| R | Scalar r, used to store the sum of the elements of the vector x |

As illustrated in Table 16, the length of a vector in the instruction formats is variable, which can reduce the number of instructions and simplify the using of instructions. In addition, the vector formats stored at a certain interval can be supported, which can avoid an execution overhead of transforming vector formats and the space occupation of storing intermediate results. Multiple index expression modes of the sparse vector can also be supported, thereby the compatibility is higher and facilitates expanding the applicable scope of the instructions.

Maximum value of vectors, refers to calculate the position of the largest element of all elements of the sparse vector. For a sparse vector x with a length n, this instruction is configured to write the position of the largest element in the vector x to the scalar i. For the maximum value of vectors, the corresponding extension instruction is: AMAX (D_TYPE, I_TYPE, Nnz, ValX, InX, I). The meaning of each variable in the above AMAX instruction is illustrated in the Table 17 bellow.

TABLE 17

| Variable | Description of the function |
| --- | --- |
| D_TYPE | A type of data to be manipulated, supporting real numbers and imaginary numbers |
| I_TYPE | An index expression mode of the sparse vector |
| Nnz | The number of elements in the sparse vector x |
| ValX | A head address of elements in the sparse vector x |
| InX | A head address of an index of the sparse vector x |
| I | Scalar i, used to store the position of the largest element of the vector x |

As illustrated in Table 17, the length of a vector in the instruction formats is variable, which can reduce the number of instructions and simplify the using of instructions. In addition, the vector formats stored at a certain interval can be supported, which can avoid an execution overhead of transforming vector formats and the space occupation of storing intermediate results. Multiple index expression modes of the sparse vector can also be supported, thereby the compatibility is higher and facilitates expanding the applicable scope of the instructions an execution overhead Minimum value of vectors, refers to calculate the position of the smallest element of all elements of the sparse vector. For a sparse vector x with a length n, this instruction is configured to write the position of the smallest element in the vector x to the scalar i. For the minimum value of vectors, the corresponding extension instruction is: AMIN (D_TYPE, I_TYPE, Nnz, ValX, InX, I). The meaning of each variable in the AMIN instruction is illustrated in the Table 18 bellow.

TABLE 18

| Variable | Description of the function |
| --- | --- |
| D_TYPE | A type of data to be manipulated, supporting real numbers and imaginary numbers |
| I_TYPE | An index expression mode of the sparse vector |
| Nnz | A head address of elements in the sparse vector x |
| ValX | A head address of elements in the sparse vector x |
| InX | A head address of an index of the sparse vector x |
| I | Scalar i, used to store the position of the smallest element of vector x |

As illustrated in Table 18, the length of a vector in the instruction formats is variable, which can reduce the number of instructions and simplify the using of instructions. In addition, the vector formats stored at a certain interval can be supported, which can avoid an execution overhead of transforming vector formats and the space occupation of storing intermediate results. Multiple index expression modes of the sparse vector can also be supported, thereby the compatibility is higher and facilitates expanding the applicable scope of the instructions an execution overhead Vector outer product, refers to calculate a tensor product (outer product) of one or two sparse vectors. Given a scalar a, a vector x and a vector y, perform the following matrix vector operations.

$$A:=a*x*y^T+A$$

In the case that the above-mentioned vector$^x$ is a sparse vector, for the vector outer product, the corresponding extension instruction is: SGER (D_TYPE, I_TYPE, LAYOUT, M, N, ALPHA, Nnz, ValX, InX, Y, INCY, A, LDA). The meaning of each variable in the SGER instruction is illustrated in the Table 19 bellow.

TABLE 19

| Variable | Description of the function |
| --- | --- |
| D_TYPE | A type of data to be manipulated, supporting real numbers and imaginary numbers |
| I_TYPE | An index expression mode of the sparse vector |
| LAYOUT | Matrix storage format (including row-major order and column-major order) |
| M | The number of rows in the matrix A |
| N | The number of columns in the matrix A |
| ALPHA | Scalar a |
| Nnz | The number of elements in the sparse vector x |
| ValX | A head address of elements in the sparse vector x |
| InX | A head address of an index of the sparse vector x |
| Y | A head address of elements in the sparse vector y |
| INCY | An address interval between elements in the vector y |
| A | A head address of the matrix A |
| LDA | Low dimensional length of the matrix A, that is, a head address interval between two adjacent row vectors (row-major order) or a head address interval between two adjacent column vectors (column-major order). |

In the case that the above-mentioned vector x and vector are sparse vectors, for the vector outer product, the corresponding extension instruction is: SGER (D_TYPE, I_TYPE, LAYOUT, M, N, ALPHA, Nnz, ValX, InX, Mnz, ValY, InY, A, LDA). The meaning of each variable in the SGER instruction is illustrated in Table 20 below.

TABLE 20

| Variable | Description of the function |
|---|---|
| D_TYPE | A type of data to be manipulated, supporting real numbers and imaginary numbers |
| I_TYPE | An index expression mode of the sparse vector |
| LAYOUT | Matrix storage format (including row-major order and column-major order) |
| M | The number of rows in the matrix A |
| N | The number of columns in the matrix A |
| ALPHA | Scalar a |
| Nnz | The number of elements in the sparse vector x |
| ValX | A head address of elements in the sparse vector x |
| InX | A head address of an index of the sparse vector x |
| Mnz | The number of elements in the sparse vector y |
| ValY | A head address of elementS in the sparse vector y |
| InY | a head address of an index of the sparse vector y |
| A | A head address of thematrix A |
| LDA | Low dimensional length of the matrix A, that is, a head address interval between two adjacent row vectors (row-major order) or a head address interval between two adjacent column vectors (column-major order). |

The scalar alpha (i.e., a) in instruction formats illustrated in Tables 19 and 20 is used for scaling the result matrix, thereby increasing the flexibility of the instruction and avoiding an additional overhead of scaling with scaling instructions. The variable size of vectors and matrices can reduce the number of instructions and simplify the using of instructions. The matrices of different storage formats (row-major order and column-major order) can be proceeded, which avoids an overhead of transforming the matrix. In addition, the vector formats stored at a certain interval can be supported, which can avoid an execution overhead of transforming vector formats and the space occupation of storing intermediate results. Multiple index expression modes of the sparse vector can also be supported, thereby the compatibility is higher and facilitates expanding the applicable scope of the instructions.

Matrix-vector multiplication, refers to calculate a product of a matrix and a vector. Given a matrix A, a vector x, a vector y, a scalar x, and a scalar y, perform the following matrix-vector multiplication.

$$y := \alpha * A * x + \beta * y$$

In the case that the above-mentioned vector x is a sparse vector, for the above-mentioned matrix-vector multiplication, the corresponding extension instruction is: GEMV (D_TYPE, I_TYPE, LAYOUT, TRANS, M, N, ALPHA, Nnz, ValX, InX,BETA, Y, INCY). The meaning of each variable in the GEMV instruction is illustrated in Table 21 below.

TABLE 21

| Variable | Description of the function |
|---|---|
| D_TYPE | A type of data to be manipulated, supporting real numbers and imaginary numbers |
| I_TYPE | An index expression mode of the sparse vector |
| LAYOUT | Matrix storage format (including row-major order and column-major order) |
| TRANS | Information indicating the matrix transformation: whether to perform transposition, whether to conjugate the complex matrix, etc. |
| M | The number of rows in the matrix A |
| N | The number of columns in the matrix A |
| ALPHA | Scalar a |
| A | A head address of the matrix A |
| LDA | Low dimensional length of the matrix A, that is, a head address interval between two adjacent row vectors (row-major order) or a head address interval between two adjacent column vectors (column-major order). |

TABLE 21-continued

| Variable | Description of the function |
|---|---|
| Nnz | The number of elements in the sparse vector x |
| ValX | A head address of elements in the sparse vector x |
| InX | A head address of an index of the sparse vector x |
| BETA | Scalar |
| Y | A head address of elements in the vector y |
| INCY | An address interval between elements in the sparse vector y |

In the case that the above-mentioned vector x and matrix A are a sparse vector and a sparse matrix respectively, for the above-mentioned matrix-vector multiplication, the corresponding extension instruction is: GEMV (D_TYPE, I_TYPE, LAYOUT, TRANS, M, Nnzs, ALPHA, A, Nnz, VaiX, InX), Mnz, ValY, InY, BETA, Y, INCY). The meaning of each variable in the GEMV instruction is illustrated in Table 22 below.

TABLE 22

| Variable | Description of the function |
|---|---|
| D_TYPE | A type of data to be manipulated, supporting real numbers and imaginary numbers |
| I_TYPE | An index expression mode of the sparse vector |
| LAYOUT | Matrix storage format (including row-major order and column-major order) |
| TRANS | Information indicating the matrix transformation: whether to perform transposition, whether to conjugate the complex matrix, etc. |
| M | The number of rows in the matrix A |
| N | The number of columns in the matrix A |
| ALPHA | Scalar a |
| NnzAs | The number of non-zero elements in each row of the sparse matrix A |
| ValAs | A head address of non-zero elements of each row of the sparse matrix A |
| InAs | A head address of an index of each row of the sparse matrix A |
| LDA | Low dimensional length of the matrix A, that is, a head address interval between two adjacent row vectors (row-major order) or a head address interval between two adjacent column vectors (column-major order). |
| Mnz | The number of elements in the sparse vector x |
| ValX | A head address of elements in the sparse vector x |
| InX | A head address of an index of the sparse vector x |
| BETA | Scalar |
| Y | A head address of elements in the vector y |
| INCY | An address interval between elements in the vector y |

The scalar alpha (i.e., $\alpha$) and beta (i.e., $\beta$) in the instruction formats in Tables 21 and 22 is used for scaling the matrix and vector, thereby increasing the flexibility of the instruction and avoiding additional overheads of scaling with scaling instructions. The variable size of vectors and matrices can reduce the number of instructions and simplify the using of instructions. It can proceed matrices of different storage formats (row-major order and column-major order), avoiding overheads of transforming the matrix. It can implement transformations such as transposition and conjugation of the matrix, avoiding additional overheads caused by proceeding a matrix transformation alone. In addition, the vector formats stored at a certain interval can be supported, which can avoid an execution overhead of transforming vector formats and the space occupation of storing intermediate results. The matrix formats stored at a certain interval can be supported, which can avoid an execution overhead of transforming matrix formats and the space occupation of storing intermediate results.

Matrix multiplication, refers to calculate the matrix multiplication. The instruction is configured to perform a scalar-matrix-matrix multiplication and to add a result to a product of a scalar and a matrix. The operation is defined as follows.

$$C:=\alpha*OP(A)*OP(B)+\beta*C$$

Where the op(A) and the op(B) respectively represent results of a transposition, a conjugation, and the like of the A and B. When the matrix A is a sparse matrix, for the above-mentioned matrix multiplication, the corresponding extension instruction is: GEMM (D_TYPE, I_TYPE, LAYOUT, TRANSA, TRANSB, M, N, K, ALPHA, NnzAs, ValAs, InAs, LDA, B, LDB, BETA, Y, INCY). The meaning of each variable in the GEMM instruction is illustrated in Table 23 below.

TABLE 23

| Variable | Description of the function |
| --- | --- |
| D_TYPE | A type of data to be manipulated, supporting real numbers and imaginary numbers |
| I_TYPE | An index expression mode of the sparse vector |
| LAYOUT | Matrix storage format (including row-major order and column-major order) |
| TRANSA | Information indicating matrix A transformation: whether to perform transposition, whether to conjugate the complex matrix, etc. |
| TRANSB | Information indicating matrix B transformation: whether to perform transposition, whether to conjugate the complex matrix, etc. |
| M | The number of rows of the matrix op(A) and the matrix C |
| N | The number of columns of the matrix op(B) and the matrix C |
| K | The number of columns of the matrix op(A) and rows of the matrix op(B) |
| ALPHA | Scalar |
| NnzAs | The number of non-zero elements in each row of the sparse matrix A |
| ValAs | A head address of non-zero elements of each row of the sparse matrix A |
| InAs | A head address of an index of each row of the sparse matrix A |
| LDA | Low dimensional length of the matrix A, that is, a head address interval between two adjacent row vectors (row-major order) or a head address interval between two adjacent column vectors (column-major order). |
| B | A head address of the matrix B |
| LDB | Low dimensional length of the matrix B, that is, a head address interval between two adjacent row vectors (row-major order) or a head address interval between two adjacent column vectors (column-major order). |
| BETA | Scalar |
| C | A head address of the matrix C |
| LDC | Low dimensional length of the matrix C, that is, a head address interval between two adjacent row vectors (row-major order) or a head address interval between two adjacent column vectors (column-major order). |

In the case that both the matrix A and the matrix B are sparse matrices, for the above-mentioned matrix-vector multiplication, the corresponding extension instruction is: GEMM (D_TYPE, I_TYPE, LAYOUT, TRANSA, TRANSB, M, N, K, ALPHA, NnzAs, ValAs, InAs, LDA, NnzBs, VaiBs, InBs, LDB, BETA, Y, INCY). The meaning of each variable in the GEMM instruction is illustrated in Table 24 below.

TABLE 24

| Variable | Description of the function |
| --- | --- |
| D_TYPE | A type of data to be manipulated, supporting real numbers and imaginary numbers |
| I_TYPE | An index expression mode of the sparse vector |
| LAYOUT | Matrix storage format (including row-major order and column-major order) |
| TRANSA | Information indicating matrix A transformation: whether to perform transposition, whether to conjugate the complex matrix, etc. |
| TRANSB | Information indicating matrix B transformation: whether to perform transposition, whether to conjugate the complex matrix, etc. |
| M | The number of rows of the matrix op(A) and the matrix C |
| N | The number of columns of the matrix op(B) and the matrix C |
| K | The number of columns of the matrix op(A) and rows of the matrix op(B) |
| ALPHA | Scalar a |
| NnzAs | The number of non-zero elements in each row of the sparse matrix A |
| ValAs | A head address of non-zero elements of each row of the sparse matrix A |
| InAs | A head address of an index of each row of the sparse matrix A |
| LDA | Low dimensional length of the matrix A, that is, a head address interval between two adjacent row vectors (row-major order) or a head address interval between two adjacent column vectors (column-major order). |
| NnzBs | The number of non-zero elements in each row of the sparse matrix B |
| ValBs | A head address of non-zero elements of each row of the sparse matrix B |
| InBs | A head address of an index of each row of the sparse matrix B |
| LDB | Low dimensional length of the matrix B, that is, a head address interval between two adjacent row vectors (row-major order) or a head address interval between two adjacent column vectors (column-major order). |
| BETA | Scalar |
| C | A head address of matrix C |
| LDC | Low dimensional length of the matrix C, that is, a head address interval between two adjacent row vectors (row-major order) or a head address interval between two adjacent column vectors (column-major order). |

The scalar alpha (i.e., $\alpha$) and beta (i.e., $\beta$) in the instruction formats in Tables 23 and 24 is used for scaling the matrix, thereby increasing the flexibility of the instruction and avoiding additional an overhead of scaling with scaling instructions. The variable size of vectors and matrices can reduce the number of instructions and simplify the using of instructions. It can implement transformations such as transposition and conjugation of the matrix, avoiding additional overheads caused by proceeding a matrix transformation alone. It can proceed matrices of different storage formats (row-major order and column-major order), avoiding overheads of transforming the matrix. In addition, the vector formats stored at a certain interval can be supported, which can avoid an execution overhead of transforming vector formats and the space occupation of storing intermediate results. Multiple index expression modes of the sparse vector can also be supported, thereby the compatibility is higher and facilitates expanding the applicable scope of the instructions.

It should be noted that a vector or a matrix in the same instruction in any of the above-mentioned tables may have different data types such as floating point, fixed point, bit width, complex number and the like. The transformations in the instruction may include other operations such as inversion of a matrix, in addition to the transposition and the complex conjugation, and these transformations may be combined with each other. For vector operations, operators can be replaced with other types of operations, for example, a vector addition may be replaced with a vector multiplication, a vector division, etc., and an operation for obtaining a maximum value may be replaced with an operation for obtaining an intermediate value operation, etc.

For the operation module illustrated in FIG. 1, the specific structure of the extension instruction can be calculated when the extension instruction operation is implemented, that is, a combination of multiple calculation instructions can be implemented by one extension instruction, and it should be noted that when the operation module executes the extension instruction, the extension instruction is not split into multiple calculation instructions.

It should be noted that, in the case that the above-mentioned operation module is applied to a neural network operation, the matrices or vectors mentioned in embodiments of the present disclosure can be regarded as input neurons and output neurons. The input neurons and the output neurons are not refer to neurons in an input layer and an output layer of the entire neural network, but to neurons in any adjacent two layers of the neural network. The neurons in a lower layer of a network feed-forward operation are input neurons, and the neurons in an upper layer of the network feed-forward operation are the output neurons. Taking a convolutional neural network as an example, assume a convolutional neural network has L layers, K=1, 2, 3 ... L-1. For a $K^{th}$ layer and a $K+1^{th}$ layer, the $K^{th}$ layer is referred to as the input layer, where the neurons in the $K^{th}$ layer are the above-mentioned input neurons, and the K+1 layer is referred to as the input layer, where the neurons in the K+1I" layer are the above-mentioned output neurons. Each layer can be used as an input layer except a top layer, and a next layer is the corresponding output layer.

Each unit in the above-mentioned operation module may be a hardware circuit such as a digital circuit, an analog circuit, and the like. Physical implementations of the hardware circuits include, but are not limited to, physical devices, and the physical devices include, but not limited to, transistors, memristors, and the like. The operation unit in the above-mentioned operation module may be any suitable hardware processor such as a CPU, a GPU, an FPGA, a DSP, an ASIC, and the like. The above-mentioned memory may be any suitable magnetic storage medium or magneto-optical storage medium such as a RRAM, a DRAM, a SRAM, an EDRAM, a HBM, a HMC, and the like.

Embodiments of the present disclosure provides an operation device, which includes one or more operation modules illustrated in FIG. 1b, and the operation device is configured to obtain data to be operated and control information from other processing devices, and to perform specified neural network operations, and to pass an execution result to the other processing devices through I/O interfaces.

When the operation device includes a plurality of operation modules, the plurality of operation modules are configured to connect and to transmit data with each other through a specific structure.

The plurality of operation modules are configured to interconnect and to transmit data with each other through a fast external device interconnection bus or a peripheral component interface express (PCIE) bus to support operations of a larger-scale neural networks. The plurality of the computing modules are configured to share a control system or have respective control systems. The plurality of the operation modules are configured to share a memory or have respective memories. An interconnection manner of the plurality of operation modules is configured as an optional interconnection topology.

The operation device has higher compatibility and can be configured to connect with various types of servers through PCTE interfaces.

Embodiments of the present disclosure provide a combined processing device, which includes the above-described operation device, a universal interconnection interface, and other processing devices.

Figure 5A:
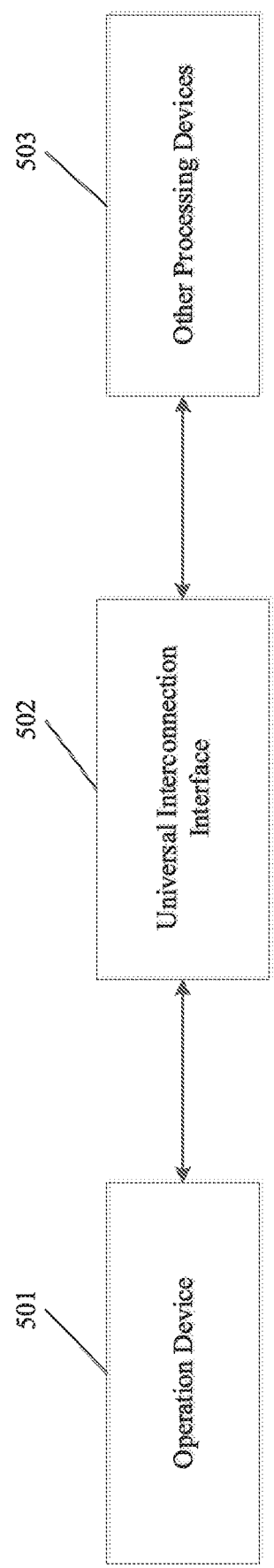
FIG. 5a is a schematic structure diagram of an operation device according to an embodiment of the present disclosure.

The operation device is configured to interact with the other processing devices to perform user-specified operations. FIG. 5a is a schematic structural diagram of a combined processing device according to an embodiment of the present disclosure. As illustrated in FIG. 5a, the combined processing device includes the above-mentioned operation device 501, a universal interconnection interface 502, and other processing devices 503.

Other processing devices 503 can include one or more of general-purpose processors and special-purpose processors, such as a central processing unit (CPU), a graphics processing unit (GPU), a machine learning processing unit, and other types of processors. It should be noted that, the number of processors included in other processing devices 503 is not limited herein. Other processing devices 503 serve as interfaces of the operation device 501 for controlling external data, for example, data transfer, and complete basic control such as opening and stopping of the operation device 501. Other processing devices 503 can also cooperate with the operation device 501 to complete an operation task.

The universal interconnection interface 502 is configured to transfer data and control instructions between the operation device 501 and the other processing devices 503. The operation device 501 is configured to acquire input data required from the other processing devices 503, and to write the input data to an on-chip storage device of the operation device 501. The control instructions can be obtained from the other processing devices 503, and written to an on-chip control register of the operation device 501. Data in the storage module of the operation device 501 can also be read and transmitted to the other processing devices 503.

Figure 5B:
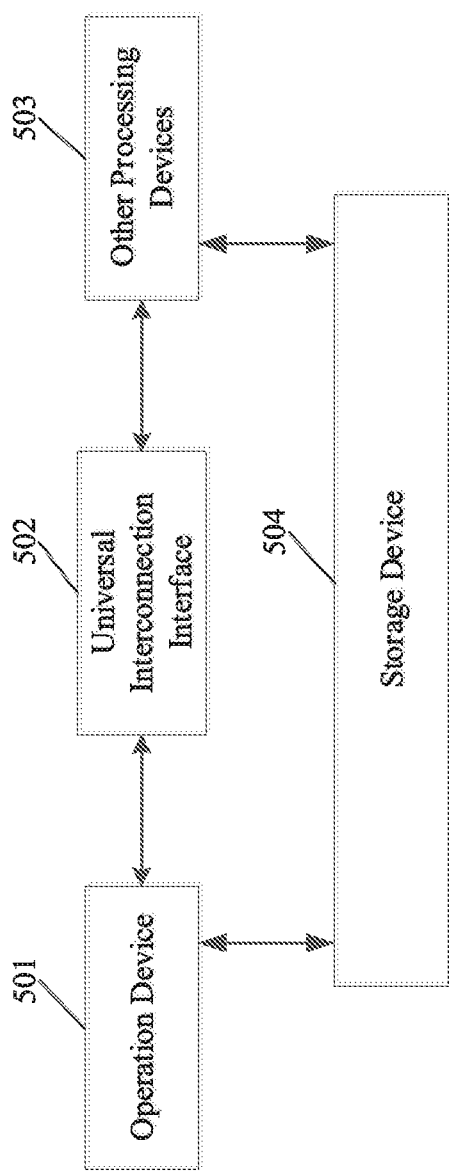
FIG. 5b is a schematic structure diagram of another operation device according to an embodiment of the present disclosure.

Optionally, as illustrated in FIG. 5b, the combined processing device further includes a storage device 504, which is configured to store data required by the operation unit/operation device or other operation unit, and is particularly suitable for data that cannot be completely stored in internal storages of the operation device 501 or the other processing devices 503.

The combined device can be used as an on-chip system for smart devices such as mobile phones, robots, drones and the like, thereby effectively reducing core area of a control portion, increasing processing speed, and reducing overall power consumption.

Embodiments of the present disclosure provides a neural network chip, which includes the operation modules illustrated in FIG. 1b, or the above-mentioned operation device or the above-mentioned combined processing devices.

Embodiments of the present disclosure provide a neural network chip package structure, which includes the above-mentioned neural network chip.

Embodiments of the present disclosure provide a board, which includes the above-mentioned neural network chip package structure. The board can be used in multiple general-purpose or special-purpose computing system environments or configurations such as personal computers, server computers, handheld devices or portable devices, tablet devices, smart homes, home appliances, multiprocessor systems, microprocessor-based systems, robots, programmable consumer electronics, personal computers (PC), small computers, mainframe computers, distributed computing environment including any of the above-mentioned systems or devices, and so on.

In an embodiment, the present disclosure discloses an electronic device, which includes the above-mentioned card or neural network chip package structure 11.

The Electronic device may include data processing devices, robots, computers, printers, scanners, tablets, smart terminals, mobile phones, driving recorders, navigators, sensors, cameras, servers, cameras, video cameras, projectors, watches, earphones, mobile storage, wearable devices, vehicles, household appliances, and/or medical equipment.

The vehicles may include airplanes, ships, and/or other vehicles; the household appliances may include televisions, air conditioners, microwave ovens, refrigerators, rice cookers, humidifiers, washing machines, electric lamps, gas stoves, range hoods; the medical devices may include nuclear magnetic resonance instruments, B-ultrasound and/or electrocardiographs.

Figure 6:
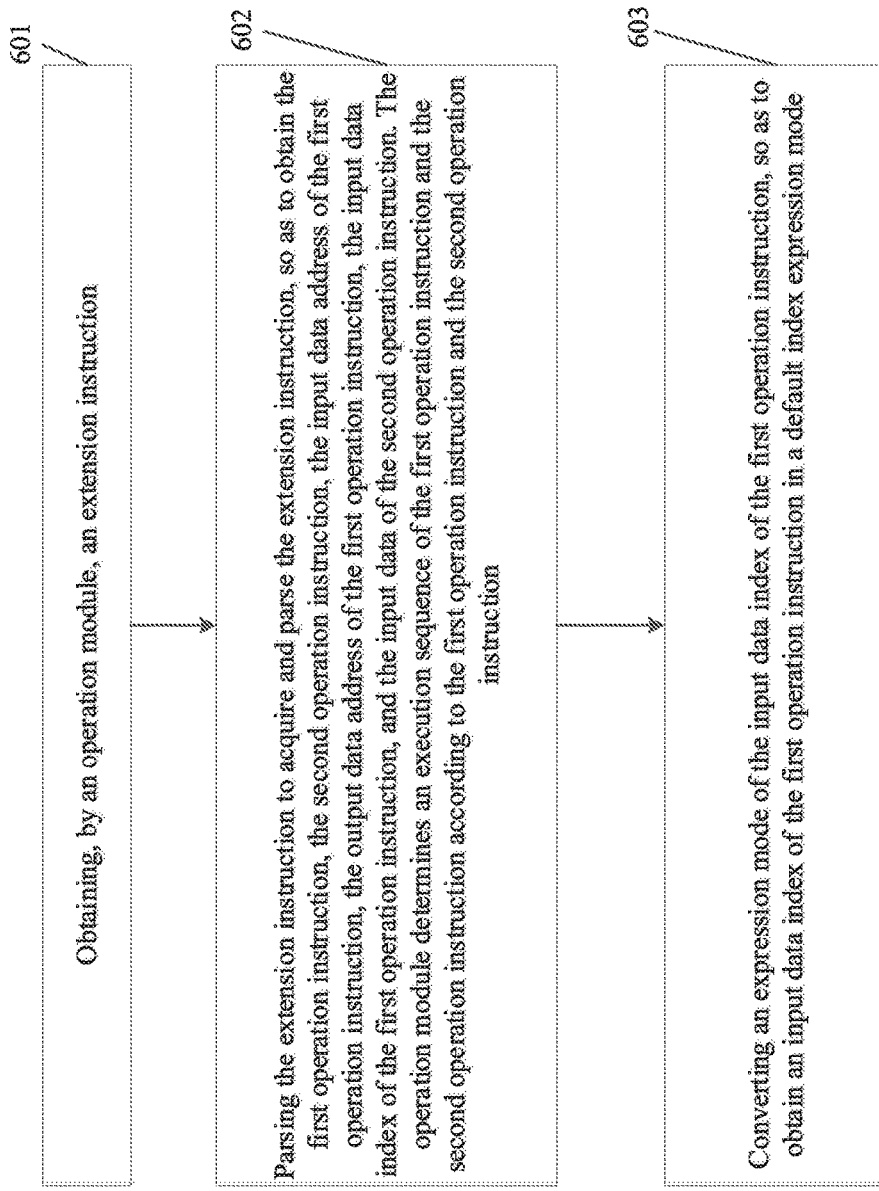
FIG. 6 is a schematic flow chart of an operation method according to an embodiment of the present disclosure.

FIG. 6 is a schematic flow chart of an operation method according to an embodiment of the present disclosure. As illustrated in FIG. 6, the method starts in block S601.

In block S601, the operation module obtains an extension instruction.

The extension instruction includes an opcode and an opcode domain, the opcode includes a first operation instruction identifier, and the opcode domain includes an input data address of an first operation instruction, an input data index of the first operation instruction, an output data address of the first operation instruction, a second operation instruction identifier, an input data of an second operation instruction, types of the input data of the second operation instruction, and a length N of the input data of the second operation instruction.

In block S602, the operation module parses the extension instruction to acquire and parse the extension instruction, so as to obtain the first operation instruction, the second operation instruction, the input data address of the first operation instruction, the output data address of the first operation instruction, the input data index of the first operation instruction, and the input data of the second operation instruction. The operation module determines an execution sequence of the first operation instruction and the second operation instruction according to the first operation instruction and the second operation instruction. The operation module reads the input data of the first operation instruction corresponding to the input data address of the first operation instruction from the memory according to the input data address of the first operation instruction.

An execution sequence of the first operation instruction and the second operation instruction may be determined as follows, according to the first operation instruction and the second operation instruction.

A determination may be made whether an output data of the first operation instruction is the same as the input data of the second operation instruction, and a determination may be made that the execution sequence is in forward order based on a determination that the input data of the first operation instruction is the same as the output data of the second operation instruction.

A determination may be made whether the input data of the first operation instruction is the same as the output data of the second operation instruction, and a determination may be made that the execution sequence is in reverse order based on a determination that the input data of the first operation instruction is the same as the output data of the second operation instruction.

A determination may be made whether the input data of the first operation instruction is associated with the output data of the second operation instruction, and a determination may be made that the execution sequence is out of order based on a determination that the input data of the first operation instruction is not associated with the output data of the second operation instruction.

A determination may be made whether the output data of the first operation instruction is associated with the input data of a second operation instruction, and a determination may be made that the execution sequence is out of order based on a determination that the output data of the first operation instruction is not associated with the input data of an second operation instruction.

In block S603, the operation module converts an expression mode of the input data index of the first operation instruction, so as to obtain an input data index of the first operation instruction in a default index expression mode. The operation module screens the input data of the first operation instruction according to the input data index of the first operation instruction in the default index expression mode, so as to obtain the input data processed of the first operation instruction. The operation module executes the first operation instruction and the second operation instruction for the input data processed of the first operation instruction and the input data of the second operation instruction respectively according to the execution sequence, so as to obtain an operation result.

The converting an expression mode of the input data index of the first operation instruction so as to obtain an input data index of the first operation instruction in a default index expression mode includes the following.

A determination may be made whether the expression mode of the input data index of the first operation instruction is a default index expression mode.

The expression mode of the input data index of the first operation instruction may be converted into the default index expression mode according to a converting instruction, based on a determination that the expression mode of the input data index of the first operation instruction is not the default expression mode, so as to obtain the input data index of the first operation instruction in the default index expression mode.

In an implementation, the expression mode of the input data index of the first operation instruction includes a direct indexing expression mode, a step indexing expression mode, a list of list (LIL) expression mode, a coordinate list (COO) expression mode, a compressed sparse row (CSR) expression mode, a compressed sparse column (CSC) expression mode, an Ellpack-ltpack (ELL) expression mode, and a hybrid (HYB) expression mode; and the default indexing expression mode includes the direct indexing expression mode, the step indexing expression mode, the LIL expression mode, the COO expression mode, the CSR expression mode, the CSC expression mode, the ELL expression mode, and the HYB expression mode.

In an implementation, the input data of the first operation instruction may be configured as sparse data, and when the input data index of the first operation instruction is expressed in the direct indexing expression mode, the input data index of the first operation instruction is a string consisting of 0's and 1's, where the number 0 indicates that an absolute value of an element in the input data of the first operation instruction is less than or equal to a preset threshold, the number 1 indicates that an absolute value of an element in the input data of the first operation instruction is greater than the preset threshold.

Alternatively, the input data of the first operation instruction may be configured as sparse data, and when the input data index of the first operation instruction is expressed in the step indexing expression mode, the input data index of the first operation instruction is a string consisting of a distance between an element in the input data of the first operation instruction whose absolute value is larger than the preset threshold between a previous element in the input data of the first operation instruction whose absolute value is larger than the preset threshold.

Alternatively, the input data of the first operation instruction is configured as sparse data, and the input data of the first operation instruction is expressed by a matrix form; when the input data index of the first operation instruction is expressed in the LIL expression mode, the input data index of the first operation instruction includes at least one list, and each of the at least one list includes at least one record, where the record includes a column index of an element in the input data of the first operation instruction whose absolute value is larger than the preset threshold and a value of the element whose absolute value is larger than the preset threshold.

Alternatively, the input data of the first operation instruction is configured as sparse data, and the input data of the first operation instruction is expressed by a matrix form; when the input data index of the first operation instruction is expressed in the COO expression mode, the input data index of the first operation instruction includes at least one tuple, and the tuple includes a row number and a column number, in a input data matrix of the first operation instruction, of an element in the input data matrix of the first operation instruction whose absolute value is greater than the preset threshold, and a value of the element.

Alternatively, the input data of the first operation instruction is configured as sparse data, and the input data of the first operation instruction is expressed by a matrix form; when the input data index of the first operation instruction is expressed in the CSR expression mode, the input data index of the first operation instruction includes a first array, a second array, and a third array; where the first array is configured to store a value of an element in the input data matrix of the first operation instruction whose absolute value is greater than the preset threshold, the second array is configured to store a column index, in the input data matrix of the first operation instruction, of an element in the input data matrix of the first operation instruction whose absolute value is larger than the preset threshold, the third array is configured to store a sum of the number of elements in each row and the number of elements in the preceding rows of the input data matrix of the first operation instruction whose absolute values are greater than the preset threshold, and a last element in the third array is configured to store the number of elements in the input data matrix of the first operation instruction whose absolute value are greater than the preset threshold.

Alternatively, the input data of the first operation instruction is configured as sparse data, and the input data of the first operation instruction is expressed by a matrix form; when the input data index of the first operation instruction is expressed in the CSC expression mode, the input data index of the first operation instruction includes a fourth array, a fifth array, and a sixth array; where the fourth array is configured to store a value of an element in the input data matrix of the first operation instruction whose absolute value is greater than the preset threshold, the fifth array is configured to store a row index, in the input data matrix of the first operation instruction, of an element in the input data matrix of the first operation instruction whose absolute value is larger than the preset threshold, the sixth array is configured to store a sum of the number of elements in each column and the number of elements in the preceding columns of the input data matrix of the first operation instruction whose absolute values are greater than the preset threshold, and a last element in the sixth array is configured to store the number of elements in the input data matrix of the first operation instruction whose absolute value are greater than the preset threshold.

Alternatively, the input data of the first operation instruction is configured as sparse data, and the input data of the first operation instruction is expressed by a matrix form; when the input data index of the first operation instruction is expressed in the ELL expression mode, the input data index of the first operation instruction includes a first matrix and a second matrix; where the first matrix is configured to store a column number, in the input data matrix of the first operation instruction, of an element in the input data matrix of the first operation instruction whose absolute value is greater than the preset threshold, the second matrix is configured to store a value of an element whose absolute value is greater than the preset threshold.

Alternatively, the input data of the first operation instruction is configured as sparse data, and the input data of the first operation instruction is expressed by a matrix form; when the input data index of the first operation instruction is expressed in the HYB expression mode, the input data index of the first operation instruction includes a third matrix, a fourth matrix, and at least one tuple; where the fourth matrix is configured to store a largest identical number of elements of each row in the input data matrix of the first operation instruction whose absolute values are greater than the preset threshold, the third matrix is configured to store a column number, in the input data matrix of the first operation instruction, of an element stored in the fourth matrix whose absolute value is greater than the preset threshold, each tuple of the at least one tuple is configured to store a row number, a column number, and a value of an additional element of each row of the input data matrix of the first operation instruction with respect to other rows.

It should be noted that a detailed description of the foregoing embodiments of the method may be referred to the related description of the embodiment illustrated in FIG. 1, and is not described herein.

It should be noted that, for the foregoing method embodiments, for simple description, they are all expressed as a series of action combinations, but those skilled in the art should understand that the present disclosure is not limited by the described action sequences. Because certain steps may be performed in other sequences or concurrently in accordance with the present disclosure. In addition, those skilled in the art should also understand that the embodiments described in the specification are optional embodiments, and the actions and modules involved are not necessarily required by the present disclosure.

In the above embodiments, the descriptions of the various embodiments have their own emphasis, and the parts that are not detailed in a certain embodiment can be referred to the related descriptions of other embodiments.

In the several embodiments provided herein, it should be understood that the disclosed device may be implemented in other ways. For example, the device embodiments described above are merely illustrative. For example, the division of the unit is only a logical function division. In actual implementation, there may be another division manner. For example, multiple units or components may be combined or may be integrate into another system, or some features can be ignored or not executed. In addition, the mutual coupling or direct coupling or communication connection illustrated or discussed may be an indirect coupling or communication connection through some interfaces, devices or units, and may be electrical or otherwise.

The units described as separate components may or may not be physically separated, and the components displayed as units may or may not be physical units, that is, may be located in one place, or may be distributed to multiple network units. Some or all of the units may be selected according to actual needs to achieve the purpose of the solution of the embodiment.

Moreover, each functional unit in each embodiment of the present disclosure may be integrated into one processing unit, or each unit may exist physically separately, or two or more units may be integrated into one unit.

The embodiments of the present disclosure have been described in detail above, and the principles and implementations of the present disclosure are described herein by using specific examples. The description of the above embodiments is only for helping to understand the method and core ideas of the present disclosure. At the same time, for those skilled in this art, according to the idea of the present disclosure, there will be changes in the specific embodiments and application scopes. In conclusion, the contents of the specification should not be construed as limiting the disclosure.

What is claimed is:

1. An operation module, applicable to execute operations according to an extension instruction, comprising a memory, an operation unit, and a control unit; wherein the control unit, is configured to:
   acquire the extension instruction that includes an opcode and one or more opcode domains,
   parse the extension instruction to obtain a first operation instruction and a second operation instruction,
   wherein the first operation instruction includes a first operation instruction identifier that identifies the first operation instruction, an input data address of a first operation instruction, and an output data address of the first operation instruction,
   wherein the second operation instruction includes a second operation instruction identifier that identifies the second operation instruction, an input data address of the second operation instruction, and an output data address of the second operation instruction, and
   wherein the first operation instruction identifier is indicated by the opcode;
   determine an execution sequence of the first operation instruction and the second operation instruction according to the first operation instruction and the second operation instruction; and
   read input data of the first operation instruction corresponding to the input data address of the first operation instruction from the memory according to the input data address of the first operation instruction; and
   the operation unit, is configured to:
   convert an expression mode of an input data index of the first operation instruction, so as to obtain the input data index of the first operation instruction in a default indexing expression mode;
   screen the input data of the first operation instruction according to the input data index of the first operation instruction in the default indexing expression mode; and
   execute the first operation instruction and the second operation instruction for the input data of the first operation instruction and input data of the second operation instruction respectively according to the execution sequence, so as to obtain an operation result.

2. The operation module of claim 1, wherein the operation unit comprises an index processing unit, which is configured to:
   determine whether the expression mode of the input data index of the first operation instruction is a default indexing expression mode;
   convert the expression mode of the input data index of the first operation instruction into the default indexing expression mode according to a converting instruction, based on a determination that the expression mode of the input data index of the first operation instruction is not the default expression mode, so as to obtain the input data index of the first operation instruction in the default indexing expression mode; and to
   screen the input data of the first operation instruction according to the input data index of the first operation instruction in the default indexing expression mode, so as to obtain the input data of the first operation instruction.

3. The operation module of claim 2, wherein the expression mode of the input data index of the first operation instruction comprises a direct indexing expression mode, a step indexing expression mode, a list of list (LIL) expression mode, a coordinate list (COO) expression mode, a compressed sparse row (CSR) expression mode, a compressed sparse column (CSC) expression mode, an Ellpack-Itpack (ELL) expression mode, and a hybrid (HYB) expression mode; and the default indexing expression mode comprises the direct indexing expression mode, the step indexing expression mode, the LIL expression mode, the COO expression mode, the CSR expression mode, the CSC expression mode, the ELL expression mode, and the HYB expression mode.

4. The operation module of claim 3, wherein the input data of the first operation instruction is configured as sparse data, and when the input data index of the first operation instruction is expressed in the direct indexing expression mode, the input data index of the first operation instruction is a string consisting of 0's and 1's, wherein the number 0 indicates that an absolute value of an element in the input data of the first operation instruction is less than or equal to a preset threshold, the number 1 indicates that an absolute value of an element in the input data of the first operation instruction is greater than the preset threshold.

5. The operation module according to claim 1, further comprising:
   a register unit, configured to store the extension instruction;
   a dependency relationship processing unit, configured to determine whether input data accessed by the extension instruction is the same as that accessed by a previous extension instruction prior to acquiring the extension instruction by the control unit; wherein a first operation instruction and a second operation instruction of a current extension instruction are provided to the operation unit when the previous extension instruction have been executed based on a determination that the input data accessed by the extension instruction is the same as that accessed by the previous extension instruction, and the first operation instruction and the second operation instruction of the current extension instruction are provided to the operation unit based on a determination that the input data accessed by the extension instruction is not the same as that accessed by the previous extension instruction;

wherein the dependency relationship processing unit is further configured to store the current extension instruction in a memory queue when the input data accessed by the extension instruction is the same as that accessed by the previous extension instruction, and to provide the current extension instruction in the memory queue to the control unit when the previous extension instruction have been executed.

6. The operation module of claim 5, wherein the control unit comprises:
a fetch subunit, configured to obtain the extension instruction from the register unit;
a decoding subunit, configured to decode the extension instruction to obtain the first operation instruction, the second operation instruction, and the execution sequence;
an instruction queue subunit, configured to store the first operation instruction and the second operation instruction according to the execution sequence.

7. The operation module of claim 2, wherein the operation unit further comprises a vector adder circuit, a vector multiplier circuit, a comparison circuit, a nonlinear operation circuit, and a vector-scalar multiplier circuit, wherein the operation unit is configured as a multi-pipeline architecture;
wherein the index processing unit is located at a first pipeline stage, the vector multiplier circuit and the vector-scalar multiplier circuit are located at a second pipeline stage, the comparison circuit and the vector adder circuit are located at a third pipeline stage, and the non-linear operation circuit is located at a fourth flow level, wherein an output data of the first pipeline stage is an input data of the second pipeline stage, an output data of the second pipeline stage is an input data of the third pipeline stage, and an output data of the third pipeline stage is an input data of the fourth pipeline stage.

8. The operation module of claim 7, wherein the operation unit further comprises a conversion circuit, the conversion circuit is located at the second pipeline stage and the fourth pipeline stage, or the conversion circuit is located at the second pipeline stage, or the conversion circuit is located at the fourth pipeline stage.

9. The operation module of claim 1, wherein the control unit is configured to:
determine whether an output data of the first operation instruction is the same as the input data of the second operation instruction, and to determine that the execution sequence is in forward order based on a determination that the input data of the first operation instruction is the same as the output data of the second operation instruction;
determine whether the input data of the first operation instruction is the same as the output data of the second operation instruction, and to determine that the execution sequence is in reverse order based on a determination that the input data of the first operation instruction is the same as the output data of the second operation instruction;
determine whether the input data of the first operation instruction is associated with the output data of the second operation instruction, and to determine that the execution sequence is out of order based on a determination that the input data of the first operation instruction is not associated with the output data of the second operation instruction;

determine whether the output data of the first operation instruction is associated with the input data of an second operation instruction, and to determine that the execution sequence is out of order based on a determination that the output data of the first operation instruction is not associated with the input data of an second operation instruction.

10. An operation method, comprising:
acquiring an extension instruction, wherein the extension instruction comprises an opcode and one or more opcode domains,
parsing the extension instruction to obtain a first operation instruction and a second operation instruction,
wherein the first operation instruction includes a first operation instruction identifier that identifies the first operation instruction, an input data address of a first operation instruction, and an output data address of the first operation instruction,
wherein the second operation instruction includes a second operation instruction identifier that identifies the second operation instruction, an input data address of the second operation instruction, and an output data address of the second operation instruction, and
wherein the first operation instruction identifier is indicated by the opcode; and
converting an expression mode of an input data index of the first operation instruction, so as to obtain the input data index of the first operation instruction in a default indexing expression mode;
screening input data of the first operation instruction according to the input data index of the first operation instruction in the default indexing expression mode; and
executing the first operation instruction and the second operation instruction for the input data of the first operation instruction and input data of the second operation instruction respectively according to the execution sequence, so as to obtain an operation result.

11. The method of claim 10, wherein the converting an expression mode of the input data index of the first operation instruction so as to obtain an input data index of the first operation instruction in a default indexing expression mode comprises:
determining whether the expression mode of the input data index of the first operation instruction is a default indexing expression mode; and
converting the expression mode of the input data index of the first operation instruction into the default indexing expression mode according to a converting instruction, based on a determination that the expression mode of the input data index of the first operation instruction is not the default expression mode, so as to obtain the input data index of the first operation instruction in the default indexing expression mode.

12. The method of claim 10, wherein the expression mode of the input data index of the first operation instruction comprises a direct indexing expression mode, a step indexing expression mode, a list of list (LIL) expression mode, a coordinate list (COO) expression mode, a compressed sparse row (CSR) expression mode, a compressed sparse column (CSC) expression mode, an Ellpack-ltpack (ELL) expression mode, and a hybrid (HYB) expression mode; and the default indexing expression mode comprises the direct indexing expression mode, the step indexing expression mode, the LIL expression mode, the COO expression mode, the CSR expression mode, the CSC expression mode, the ELL expression mode, and the HYB expression mode.

13. The method of claim 12, wherein the input data of the first operation instruction is configured as sparse data, and when the input data index of the first operation instruction is expressed in the direct indexing expression mode, the input data index of the first operation instruction is a string consisting of 0's and 1's, wherein the number 0 indicates that an absolute value of an element in the input data of the first operation instruction is less than or equal to a preset threshold, the number 1 indicates that an absolute value of an element in the input data of the first operation instruction is greater than the preset threshold.

14. The method according to claim 10, wherein the determining an execution sequence of the first operation instruction and the second operation instruction according to the first operation instruction and the second operation instruction comprising:
  determining whether an output data of the first operation instruction is the same as the input data of the second operation instruction, and determining that the execution sequence is in forward order based on a determination that the input data of the first operation instruction is the same as the output data of the second operation instruction;
  determining whether the input data of the first operation instruction is the same as the output data of the second operation instruction, and determining that the execution sequence is in reverse order based on a determination that the input data of the first operation instruction is the same as the output data of the second operation instruction;
  determining whether the input data of the first operation instruction is associated with the output data of the second operation instruction, and determining that the execution sequence is out of order based on a determination that the input data of the first operation instruction is not associated with the output data of the second operation instruction;
  determining whether the output data of the first operation instruction is associated with the input data of an second operation instruction, and determining that the execution sequence is out of order based on a determination that the output data of the first operation instruction is not associated with the input data of an second operation instruction.

15. The operation module of claim 3,
  wherein the input data of the first operation instruction is configured as sparse data, and when the input data index of the first operation instruction is expressed in the step indexing expression mode, the input data index of the first operation instruction is a string consisting of a distance between an element in the input data of the first operation instruction whose absolute value is larger than the preset threshold between a previous element in the input data of the first operation instruction whose absolute value is larger than the preset threshold.

16. The operation module of claim 3,
  wherein the input data of the first operation instruction is configured as sparse data, and the input data of the first operation instruction is expressed by a matrix form; when the input data index of the first operation instruction is expressed in the LIL expression mode, the input data index of the first operation instruction comprises at least one list, and each of the at least one list comprises at least one record, wherein the record comprises a column index of an element in the input data of the first operation instruction whose absolute value is larger than the preset threshold and a value of the element whose absolute value is larger than the preset threshold.

17. The operation module of claim 3,
  wherein the input data of the first operation instruction is configured as sparse data, and the input data of the first operation instruction is expressed by a matrix form; when the input data index of the first operation instruction is expressed in the COO expression mode, the input data index of the first operation instruction comprises at least one tuple, and the tuple comprises a row number and a column number, in a input data matrix of the first operation instruction, of an element in the input data matrix of the first operation instruction whose absolute value is greater than the preset threshold, and a value of the element.

18. The operation module of claim 3,
  wherein the input data of the first operation instruction is configured as sparse data, and the input data of the first operation instruction is expressed by a matrix form; when the input data index of the first operation instruction is expressed in the CSR expression mode, the input data index of the first operation instruction comprises a first array, a second array, and a third array; wherein the first array is configured to store a value of an element in the input data matrix of the first operation instruction whose absolute value is greater than the preset threshold, the second array is configured to store a column index, in the input data matrix of the first operation instruction, of an element in the input data matrix of the first operation instruction whose absolute value is larger than the preset threshold, the third array is configured to store a sum of the number of elements in each row and the number of elements in the preceding rows of the input data matrix of the first operation instruction whose absolute values are greater than the preset threshold, and a last element in the third array is configured to store the number of elements in the input data matrix of the first operation instruction whose absolute value are greater than the preset threshold.

19. The operation module of claim 3,
  wherein the input data of the first operation instruction is configured as sparse data, and the input data of the first operation instruction is expressed by a matrix form; when the input data index of the first operation instruction is expressed in the CSC expression mode, the input data index of the first operation instruction comprises a fourth array, a fifth array, and a sixth array; wherein the fourth array is configured to store a value of an element in the input data matrix of the first operation instruction whose absolute value is greater than the preset threshold, the fifth array is configured to store a row index, in the input data matrix of the first operation instruction, of an element in the input data matrix of the first operation instruction whose absolute value is larger than the preset threshold, the sixth array is configured to store a sum of the number of elements in each column and the number of elements in the preceding columns of the input data matrix of the first operation instruction whose absolute values are greater than the preset threshold, and a last element in the sixth array is configured to store the number of elements in the input data matrix of the first operation instruction whose absolute value are greater than the preset threshold.

20. The operation module of claim 3,
  wherein the input data of the first operation instruction is configured as sparse data, and the input data of the first operation instruction is expressed by a matrix form;

when the input data index of the first operation instruction is expressed in the ELL expression mode, the input data index of the first operation instruction comprises a first matrix and a second matrix; wherein the first matrix is configured to store a column number, in the input data matrix of the first operation instruction, of an element in the input data matrix of the first operation instruction whose absolute value is greater than the preset threshold, the second matrix is configured to store a value of an element whose absolute value is greater than the preset threshold.

21. The operation module of claim 3,
wherein the input data of the first operation instruction is configured as sparse data, and the input data of the first operation instruction is expressed by a matrix form; when the input data index of the first operation instruction is expressed in the HYB expression mode, the input data index of the first operation instruction comprises a third matrix, a fourth matrix, and at least one tuple; wherein the fourth matrix is configured to store a largest identical number of elements of each row in the input data matrix of the first operation instruction whose absolute values are greater than the preset threshold, the third matrix is configured to store a column number, in the input data matrix of the first operation instruction, of an element stored in the fourth matrix whose absolute value is greater than the preset threshold, each tuple of the at least one tuple is configured to store a row number, a column number, and a value of an additional element of each row of the input data matrix of the first operation instruction with respect to other rows.

22. The operation module of claim 1, wherein the operation unit is further configured to execute a plan rotation instruction to calculate a plane rotation result based at least on a count of elements of a first sparse vector, a head address of the elements in the first sparse vector, a count of elements of a second vector, a head address of the elements of the second vector, and at least one scalar value.

23. The operation module of claim 22, wherein the operation unit is further configured to calculate the plane rotation result based on an address interval of the elements of the second vector and a head address of an index of the first sparse vector.

24. The operation module of claim 23, wherein the second vector is a sparse vector.

25. The operation module of claim 1, wherein the operation unit is further configured to execute a Givens rotation instruction to calculate a Givens rotation result based at least on a count of elements of a first sparse vector, a head address of the elements of the first sparse vector, a count of elements of a second vector, a head address of the elements of the second vector, and a parameter matrix including matrix elements determined by a flag indicator.

26. The operation module of claim 25, wherein the operation unit is further configured to calculate the Givens rotation result based on an address interval of the elements in the second vector.

27. The operation module of claim 26, wherein the second vector is a sparse vector.

28. The operation module of claim 1, wherein the operation unit is further configured to execute a swap instruction to swap a first sparse vector with a second vector based at least on a count of elements of the first sparse vector, a head address of the elements in the first sparse vector, a count of elements of the second vector, and a head address of the elements of the second vector.

29. The operation module of claim 28, wherein the second vector is a sparse vector.

30. The operation module of claim 1, wherein the operation unit is further configured to execute a scaling instruction to calculate a scaling result based at least on a count of elements of a sparse vector, a head address of the elements in the sparse vector, and a scalar value.

31. The operation module of claim 1, wherein the operation unit is further configured to execute a copy instruction to copy a first sparse vector to a second sparse vector based at least on a count of elements of the first sparse vector, a head address of the elements in the first sparse vector, a count of elements of the second sparse vector, and a head address of the elements of the second sparse vector.

32. The operation module of claim 1, wherein the operation unit is further configured to execute a vector element copy instruction to copy one or more elements from a first position of a first vector to a second position of a second vector.

33. The operation module of claim 1, wherein the operation unit is further configured to execute a multiplication instruction to calculate a multiplication result by multiplying a first sparse vector with a scalar value and to calculate a sum by adding the multiplication result to a second vector based at least on a count of elements of the first sparse vector, a head address of the elements in the first sparse vector, a count of elements of the second vector, and a head address of the elements of the second vector.

34. The operation module of claim 33, wherein the second vector is a sparse vector.

35. The operation module of claim 1, wherein the operation unit is further configured to execute a dot product instruction to calculate a dot product between a first sparse vector and a second vector based at least on a count of elements of the first sparse vector, a head address of the elements in the first sparse vector, a count of elements of the second vector, and a head address of the elements of the second vector.

36. The operation module of claim 35, the second vector is a sparse vector.

37. The operation module of claim 1, wherein the operation unit is further configured to execute a norm instruction to calculate a norm of a sparse vector based at least on a count of elements in the sparse vector and a head address of the elements in the sparse vector.

38. The operation module of claim 1, wherein the operation unit is further configured to execute a sum instruction to calculate a sum result of elements of a sparse vector based on a count of elements in the sparse vector and a head address of the elements in the sparse vector.

39. The operation module of claim 1, wherein the operation unit is further configured to execute a maximum instruction to identify a maximum element of a sparse vector based at least on a count of elements in the sparse vector and a head address of the elements in the sparse vector.

40. The operation module of claim 1, wherein the operation unit is further configured to execute a minimum instruction to identify a minimum element of a sparse vector based at least on a count of elements in the sparse vector and a head address of the elements in the sparse vector.

41. The operation module of claim 1, wherein the operation unit is further configured to execute an outer product instruction to calculate an outer product between a first sparse vector and a second vector based at least on a count of elements in the first sparse vector, a head address of the elements of the first sparse vector, a head address of elements in the second vector, an address interval between the elements of the second vector, a count of rows in a matrix, and a count of columns in the matrix.

42. The operation module of claim 41, wherein the operation unit is further configured to calculate the outer product based on a matrix storage format of the matrix, a head address of the matrix, and a low dimensional length of the matrix.

43. The operation module of claim 42, wherein the second vector is a sparse vector.

44. The operation module of claim 1, wherein the operation unit is further configured to execute a matrix-vector-multiplication instruction to calculate a matrix-vector-multiplication result for a matrix, a first sparse vector, and a second vector based on a count of elements in the first sparse vector, a head address of the element in the first sparse vector, a head address of elements in the second vector, an address interval between the elements in the second vector, a count of rows in the matrix, a count of columns in the matrix, and a head address of the matrix.

45. The operation module of claim 44, wherein the operation unit is further configured calculate the matrix-vector-multiplication result based on one or more scalar values, a matrix storage format of the matrix, and a low dimensional length of the matrix.

46. The operation module of claim 45, wherein the matrix is a sparse matrix.

47. The operation module of claim 1, wherein the operation unit is further configured to execute a matrix multiplication instruction to calculate a matrix multiplication result for a first matrix, a second matrix, and a third matrix based at least on a count of rows of the first matrix, a count of columns of the third matrix, and a count of columns of the second matrix, a count of non-zero elements of each row of the first matrix, a head address of non-zero elements of each row of the first matrix, a head address of the second matrix, and a head address of the third matrix.

48. The operation module of claim 47, wherein the operation unit is further configured to calculate the matrix multiplication result based on one or more scalar values, a first low dimensional length of the first matrix, a second low dimensional length of the second matrix, and a third low dimensional length of the second matrix.

49. The operation module of claim 48, wherein the first matrix and the second matrix are sparse matrices.

50. The operation module of claim 1, wherein the one or more opcode domains include an input data index of the first operation instruction, types of the input data of the second operation instruction, and a length N of the input data of the second operation instruction.

51. The method of claim 12, wherein the input data of the first operation instruction is configured as sparse data, and when the input data index of the first operation instruction is expressed in the step indexing expression mode, the input data index of the first operation instruction is a string consisting of a distance between an element in the input data of the first operation instruction whose absolute value is larger than the preset threshold between a previous element in the input data of the first operation instruction whose absolute value is larger than the preset threshold.

52. The method of claim 12,
wherein the input data of the first operation instruction is configured as sparse data, and the input data of the first operation instruction is expressed by a matrix form; when the input data index of the first operation instruction is expressed in the LIL expression mode, the input data index of the first operation instruction comprises at least one list, and each of the at least one list comprises at least one record, wherein the record comprises a column index of an element in the input data of the first operation instruction whose absolute value is larger than the preset threshold and a value of the element whose absolute value is larger than the preset threshold.

53. The method of claim 12,
wherein the input data of the first operation instruction is configured as sparse data, and the input data of the first operation instruction is expressed by a matrix form; when the input data index of the first operation instruction is expressed in the COO expression mode, the input data index of the first operation instruction comprises at least one tuple, and the tuple comprises a row number and a column number, in a input data matrix of the first operation instruction, of an element in the input data matrix of the first operation instruction whose absolute value is greater than the preset threshold, and a value of the element.

54. The method of claim 12,
wherein the input data of the first operation instruction is configured as sparse data, and the input data of the first operation instruction is expressed by a matrix form; when the input data index of the first operation instruction is expressed in the CSR expression mode, the input data index of the first operation instruction comprises a first array, a second array, and a third array; wherein the first array is configured to store a value of an element in the input data matrix of the first operation instruction whose absolute value is greater than the preset threshold, the second array is configured to store a column index, in the input data matrix of the first operation instruction, of an element in the input data matrix of the first operation instruction whose absolute value is larger than the preset threshold, the third array is configured to store a sum of the number of elements in each row and the number of elements in the preceding rows of the input data matrix of the first operation instruction whose absolute values are greater than the preset threshold, and a last element in the third array is configured to store the number of elements in the input data matrix of the first operation instruction whose absolute value are greater than the preset threshold.

55. The method of claim 12,
wherein the input data of the first operation instruction is configured as sparse data, and the input data of the first operation instruction is expressed by a matrix form; when the input data index of the first operation instruction is expressed in the CSC expression mode, the input data index of the first operation instruction comprises a fourth array, a fifth array, and a sixth array; wherein the fourth array is configured to store a value of an element in the input data matrix of the first operation instruction whose absolute value is greater than the preset threshold, the fifth array is configured to store a row index, in the input data matrix of the first operation instruction, of an element in the input data matrix of the first operation instruction whose absolute value is larger than the preset threshold, the sixth array is configured to store a sum of the number of elements in each column and the number of elements in the preceding columns of the input data matrix of the first operation instruction whose absolute values are greater than the preset threshold, and a last element in the sixth array is configured to store the number of elements in the input data matrix of the first operation instruction whose absolute value are greater than the preset threshold.

56. The method of claim 12,
wherein the input data of the first operation instruction is configured as sparse data, and the input data of the first operation instruction is expressed by a matrix form; when the input data index of the first operation instruction is expressed in the ELL expression mode, the input data index of the first operation instruction comprises a first matrix and a second matrix; wherein the first matrix is configured to store a column number, in the input data matrix of the first operation instruction, of an element in the input data matrix of the first operation instruction whose absolute value is greater than the preset threshold, the second matrix is configured to store a value of an element whose absolute value is greater than the preset threshold.

57. The method of claim 12,
wherein the input data of the first operation instruction is configured as sparse data, and the input data of the first operation instruction is expressed by a matrix form; when the input data index of the first operation instruction is expressed in the HYB expression mode, the input data index of the first operation instruction comprises a third matrix, a fourth matrix, and at least one tuple; wherein the fourth matrix is configured to store a largest identical number of elements of each row in the input data matrix of the first operation instruction whose absolute values are greater than the preset threshold, the third matrix is configured to store a column number, in the input data matrix of the first operation instruction, of an element stored in the fourth matrix whose absolute value is greater than the preset threshold, each tuple of the at least one tuple is configured to store a row number, a column number, and a value of an additional element of each row of the input data matrix of the first operation instruction with respect to other rows.

\* \* \* \* \*